United States Patent
Akai et al.

(10) Patent No.: US 9,938,099 B2
(45) Date of Patent: Apr. 10, 2018

(54) SHEET CONVEYING DEVICE, SHEET FEEDER, AND IMAGE FORMING APPARATUS

(71) Applicants: Takeshi Akai, Kanagawa (JP); Ikuhisa Okamoto, Kanagawa (JP); Takehisa Shimazu, Kanagawa (JP); Youhei Niitsuma, Kanagawa (JP); Takaya Ochiai, Kanagawa (JP)

(72) Inventors: Takeshi Akai, Kanagawa (JP); Ikuhisa Okamoto, Kanagawa (JP); Takehisa Shimazu, Kanagawa (JP); Youhei Niitsuma, Kanagawa (JP); Takaya Ochiai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/258,342

(22) Filed: Sep. 7, 2016

(65) Prior Publication Data

US 2017/0101280 A1 Apr. 13, 2017

(30) Foreign Application Priority Data

Oct. 8, 2015 (JP) .................................. 2015-200565

(51) Int. Cl.
*B65H 5/38* (2006.01)
*B65H 5/36* (2006.01)
(Continued)

(52) U.S. Cl.
CPC .............. *B65H 5/38* (2013.01); *B65H 5/062* (2013.01); *H04N 1/0032* (2013.01);
(Continued)

(58) Field of Classification Search
CPC .................. B65H 5/38; B65H 2515/82; B65H 2601/521; B41J 29/10
See application file for complete search history.

(56) References Cited

U.S. PATENT DOCUMENTS 3,513,938 A * 5/1970 McCornack ............. B41J 29/08
178/42
3,977,492 A * 8/1976 Hankel ..................... E04B 1/86
181/292
(Continued)

FOREIGN PATENT DOCUMENTS

JP 6-008579 1/1994
JP 10007288 A * 1/1998
(Continued)

*Primary Examiner* — Luis A Gonzalez
(74) *Attorney, Agent, or Firm* — Harness, Dickey & Pierce, P.L.C.

(57) ABSTRACT

A sheet conveying device includes a conveyer to convey a sheet and a primary sheet guide, disposed downstream from the conveyer in a sheet conveyance direction, to guide the sheet conveyed by the conveyer in the sheet conveyance direction. A secondary sheet guide is disposed opposite the primary sheet guide and includes a bending portion to bend the sheet while the sheet slides over the bending portion to change the sheet conveyance direction. A sheet conveyance path is defined by the primary sheet guide and the secondary sheet guide. The primary sheet guide includes a cavity disposed opposite the sheet conveyance path and a communication through-hole communicating with the cavity and the sheet conveyance path. The communication through-hole is disposed opposite the bending portion in a direction perpendicular to the sheet conveyance direction.

18 Claims, 12 Drawing Sheets

(51) Int. Cl.
 *B65H 29/52* (2006.01)
 *B65H 5/06* (2006.01)
 *H04N 1/00* (2006.01)

(52) U.S. Cl.
 CPC ..... *H04N 1/00588* (2013.01); *H04N 1/00602* (2013.01); *H04N 1/00612* (2013.01); *H04N 1/00615* (2013.01); *B65H 2515/82* (2013.01); *B65H 2601/521* (2013.01); *B65H 2801/06* (2013.01); *H04N 2201/0094* (2013.01)

(56) References Cited

U.S. PATENT DOCUMENTS

| | | | | |
|---|---|---|---|---|
| 4,943,173 | A * | 7/1990 | Okazaki | B41J 29/10 |
| | | | | 181/201 |
| 9,441,362 | B2 * | 9/2016 | Oppenheimer | B41J 11/0085 |
| 2009/0026691 | A1 * | 1/2009 | Ishikawa | B65H 5/062 |
| | | | | 271/10.12 |
| 2010/0207323 | A1 * | 8/2010 | Kumeta | B65H 5/38 |
| | | | | 271/264 |
| 2016/0170355 | A1 | 6/2016 | Heishi et al. | |

FOREIGN PATENT DOCUMENTS

| | | |
|---|---|---|
| JP | 2008-049587 | 3/2008 |
| JP | 2009-040565 | 2/2009 |

* cited by examiner

SHEET CONVEYING DEVICE, SHEET FEEDER, AND IMAGE FORMING APPARATUS

CROSS-REFERENCE TO RELATED APPLICATION

This patent application is based on and claims priority pursuant to 35 U.S.C. § 119 to Japanese Patent Application No. 2015-200565, filed on Oct. 8, 2015, in the Japanese Patent Office, the entire disclosure of which is hereby incorporated by reference herein.

BACKGROUND

Technical Field

Example embodiments generally relate to a sheet conveying device, a sheet feeder, and an image forming apparatus, and more particularly, to a sheet conveying device for conveying a sheet, a sheet feeder incorporating the sheet conveying device, and an image forming apparatus incorporating the sheet conveying device.

Background Art

Related-art image forming apparatuses, such as copiers, facsimile machines, printers, or multifunction printers having two or more of copying, printing, scanning, facsimile, plotter, and other functions, typically form an image on a recording medium according to image data.

Such image forming apparatus includes a body, an image scanner disposed atop the body, and an auto document feeder (ADF) disposed atop the image scanner. In order to downsize the ADF, the ADF includes an original tray and an ejection tray situated below the original tray. A user places an original sheet bearing an image to be read by the image scanner on the original tray. The ejection tray receives the original sheet bearing the image that has been read by the image scanner. A sheet conveying device conveys the original sheet from the original tray to the ejection tray.

The image forming apparatus may be a multifunction peripheral including a sheet conveying device that conveys a recording sheet onto which an image is formed according to image data sent from the image scanner or a client computer connected to the multifunctional peripheral. While the original sheet or the recording sheet is conveyed through the sheet conveying device, the original sheet or the recording sheet slides over a component disposed inside the sheet conveying device, generating slide noise. The slide noise leaks out of the image forming apparatus as undesired noise, degrading an environment of the image forming apparatus.

SUMMARY

At least one embodiment provides a novel sheet conveying device that includes a conveyer to convey a sheet and a primary sheet guide, disposed downstream from the conveyer in a sheet conveyance direction, to guide the sheet conveyed by the conveyer in the sheet conveyance direction. A secondary sheet guide is disposed opposite the primary sheet guide and includes a bending portion to bend the sheet while the sheet slides over the bending portion to change the sheet conveyance direction. A sheet conveyance path is defined by the primary sheet guide and the secondary sheet guide. The primary sheet guide includes a cavity disposed opposite the sheet conveyance path and a communication through-hole communicating with the cavity and the sheet conveyance path. The communication through-hole is disposed opposite the bending portion in a direction perpendicular to the sheet conveyance direction.

At least one embodiment further provides a novel sheet feeder that includes a roller pair to feed a sheet and a sheet conveying device to convey the sheet fed by the roller pair. The sheet conveying device includes a conveyer to convey the sheet and a primary sheet guide, disposed downstream from the conveyer in a sheet conveyance direction, to guide the sheet conveyed by the conveyer in the sheet conveyance direction. A secondary sheet guide is disposed opposite the primary sheet guide and includes a bending portion to bend the sheet while the sheet slides over the bending portion to change the sheet conveyance direction. A sheet conveyance path is defined by the primary sheet guide and the secondary sheet guide. The primary sheet guide includes a cavity disposed opposite the sheet conveyance path and a communication through-hole communicating with the cavity and the sheet conveyance path. The communication through-hole is disposed opposite the bending portion in a direction perpendicular to the sheet conveyance direction.

At least one embodiment further provides a novel image forming apparatus that includes an image scanner to read an image on a sheet and a sheet conveying device to convey the sheet to the image scanner. The sheet conveying device includes a conveyer to convey the sheet and a primary sheet guide, disposed downstream from the conveyer in a sheet conveyance direction, to guide the sheet conveyed by the conveyer in the sheet conveyance direction. A secondary sheet guide is disposed opposite the primary sheet guide and includes a bending portion to bend the sheet while the sheet slides over the bending portion to change the sheet conveyance direction. A sheet conveyance path is defined by the primary sheet guide and the secondary sheet guide. The primary sheet guide includes a cavity disposed opposite the sheet conveyance path and a communication through-hole communicating with the cavity and the sheet conveyance path. The communication through-hole is disposed opposite the bending portion in a direction perpendicular to the sheet conveyance direction.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
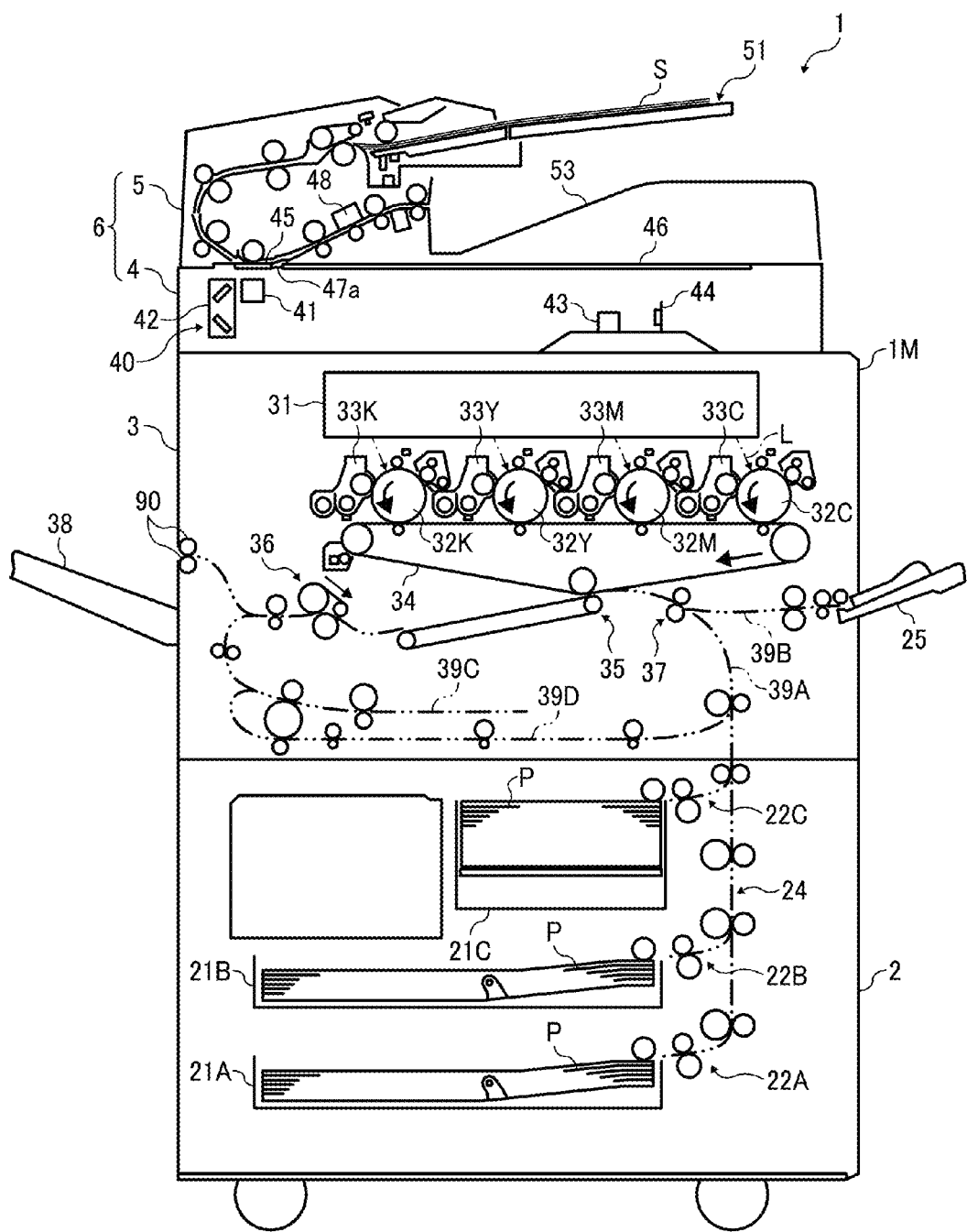
FIG. 1 is a schematic vertical cross-sectional view of an image forming apparatus according to an example embodiment of the present disclosure.

The accompanying drawings are intended to depict example embodiments and should not be interpreted to limit the scope thereof. The accompanying drawings are not to be considered as drawn to scale unless explicitly noted.

DETAILED DESCRIPTION

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a term such as "below" can encompass both an orientation of above and below. The device may be otherwise oriented (rotated 90 degrees or at other orientations) and the spatially relative descriptors used herein are interpreted accordingly.

Although the terms first, second, and the like may be used herein to describe various elements, components, regions, layers and/or sections, it should be understood that these elements, components, regions, layers and/or sections should not be limited by these terms. These terms are used to distinguish one element, component, region, layer, or section from another region, layer, or section. Thus, a first element, component, region, layer, or section discussed below could be termed a second element, component, region, layer, or section without departing from the teachings of the present disclosure.

The terminology used herein is for the purpose of describing particular embodiments and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Referring now to the drawings, wherein like reference numerals designate identical or corresponding parts throughout the several views, particularly to FIG. 1, an image forming apparatus 1 according to an example embodiment is explained.

FIG. 1 is a schematic vertical cross-sectional view of the image forming apparatus 1. The image forming apparatus 1 may be a copier, a facsimile machine, a printer, a multifunction peripheral or a multifunction printer (MFP) having at least one of copying, printing, scanning, facsimile, and plotter functions, or the like. According to this example embodiment, the image forming apparatus 1 is a color MFP that forms a color toner image on a recording medium by electrophotography. Alternatively, the image forming apparatus 1 may be a monochrome MFP that forms a monochrome toner image on a recording medium. Yet alternatively, the image forming apparatus 1 may form an image on a recording medium by inkjet printing.

Referring to FIG. 1, a description is provided of a construction of the image forming apparatus 1.

As illustrated in FIG. 1, the image forming apparatus 1 is a digital multifunction peripheral including a body 1M and an auto document feeder (ADF) 5 disposed atop the body 1M. The body 1M includes a sheet feeding device 2, an image forming device 3, and an image scanner 4. The image scanner 4 and the ADF 5 construct an image reading device 6. The ADF 5 serves as a sheet feeder.

A detailed description is now given of a construction of the sheet feeding device 2.

The sheet feeding device 2 includes three paper trays 21A, 21B, and 21C being layered vertically and loading a plurality of sheets P serving as recording media of different sizes, respectively. Each of the paper trays 21A, 21B, and 21C loads the sheets P (e.g., plain paper) having a size selected from the different sizes in portrait orientation or landscape orientation.

The sheet feeding device 2 further includes a plurality of sheet feeders 22A, 22B, and 22C that pick up and separate an uppermost sheet P from other sheets P placed on the paper trays 21A, 21B, and 21C and feed the uppermost sheet P to conveyance rollers, respectively. The sheet feeding device 2 further includes a sheet feeding path 24 provided with the conveyance rollers that convey the sheet P conveyed from one of the sheet feeders 22A, 22B, and 22C to a given image forming position inside the image forming device 3.

A detailed description is now given of a construction of the image forming device 3.

The image forming device 3 includes an exposure device 31, a plurality of photoconductive drums 32K, 32Y, 32M, and 32C, a plurality of developing devices 33K, 33Y, 33M, and 33C replenished with toners in different colors, that is, black, yellow, magenta, and cyan toners, respectively, a transfer belt 34, a secondary transfer device 35, and a fixing device 36.

The exposure device 31 generates laser beams L according to black, yellow, magenta, and cyan image data created by the image reading device 6, which expose the photoconductive drums 32K, 32Y, 32M, and 32C, respectively. The exposure device 31 exposes the photoconductive drums 32K, 32Y, 32M, and 32C with the laser beams L, forming electrostatic latent images corresponding to the black, yellow, magenta, and cyan image data on an outer circumferential surface of the photoconductive drums 32K, 32Y, 32M, and 32C, respectively.

The developing devices 33K, 33Y, 33M, and 33C disposed in proximity to the photoconductive drums 32K, 32Y, 32M, and 32C supply the black, yellow, magenta, and cyan toners to the electrostatic latent images formed on the photoconductive drums 32K, 32Y, 32M, and 32C so that the black, yellow, magenta, and cyan toners construct thin layers, thus developing the electrostatic latent images into visible black, yellow, magenta, and cyan toner images, respectively.

The black, yellow, magenta, and cyan toner images formed on the photoconductive drums 32K, 32Y, 32M, and 32C are primarily transferred onto the transfer belt 34. The secondary transfer device 35 disposed in proximity to the transfer belt 34 secondarily transfers the black, yellow, magenta, and cyan toner images from the transfer belt 34 onto the sheet P conveyed from the sheet feeding device 2, thus forming a color toner image on the sheet P. The fixing device 36 melts and fixes the color toner image on the sheet P under heat and pressure.

The image forming device 3 further includes a conveyance path 39A through which the sheet P conveyed from the sheet feeding path 24 of the sheet feeding device 2 is further conveyed to the secondary transfer device 35. The conveyance path 39A is provided with a registration roller pair 37 that adjusts a conveyance time and a conveyance speed of the sheet P. The sheet P is conveyed through a secondary transfer nip formed between the transfer belt 34 and the secondary transfer device 35 at a conveyance speed equivalent to a rotation speed of the transfer belt 34. After the sheet P passes through the secondary transfer nip and the fixing device 36, the sheet P is ejected onto an output tray 38 by an output roller pair 90.

The image forming device 3 further includes a bypass tray 25 that loads a plurality of sheets P and a bypass conveyance path 39B that delivers a sheet P from the bypass tray 25 to the conveyance path 39A at a position upstream from the registration roller pair 37 in a sheet conveyance direction.

Below the secondary transfer device 35 and the fixing device 36 are a switchback conveyance path 39C and a reverse conveyance path 39D, each of which includes a plurality of conveyance rollers and conveyance guides.

If the image forming apparatus 1 receives a duplex print job to form a toner image on both sides of the sheet P, the switchback conveyance path 39C performs switchback conveying to feed back and convey the sheet P bearing the toner image on a front side thereof to the reverse conveyance path 39D.

The reverse conveyance path 39D reverses the sheet P conveyed from the switchback conveyance path 39C and conveys the sheet P to the registration roller pair 37.

Thus, the switchback conveyance path 39C feeds back the sheet P bearing the toner image on the front side thereof and the reverse conveyance path 39D reverses and conveys the sheet P to the registration roller pair 37 which conveys the sheet P to the secondary transfer nip. As the sheet P is conveyed through the secondary transfer nip, the secondary transfer device 35 secondarily transfers another toner image formed on the transfer belt 34 onto a back side of the sheet P. After the fixing device 36 fixes the toner image on the sheet P, the sheet P is ejected onto the output tray 38 by the output roller pair 90.

A detailed description is now given of a construction of the image scanner 4.

The image scanner 4 includes a first carriage 41 mounting a light source (e.g., a lighting unit) and a mirror, a second carriage 42 mounting a mirror, an image forming lens 43, an imaging device 44, and a first exposure glass 45. The above-described components of the image scanner 4 are situated in the body 1M and construct a first side reader 40 that reads an image on a first side (e.g., a front side) of a sheet S (e.g., an original sheet) conveyed over the first exposure glass 45. The first side of the sheet S is one side of the sheet S, for example, the front side of the sheet S, conveyed automatically by the ADF 5.

The image scanner 4 further includes a second exposure glass 46 on which a sheet S (e.g., an original sheet) bearing an image is placed and an abutment 47a to abut on one edge of the sheet S to position the sheet S on the second exposure glass 46.

The first carriage 41 is disposed below the first exposure glass 45 and the second exposure glass 46 such that the first carriage 41 is movable horizontally and positioned adjustably. Light generated by the light source is reflected by the mirror and irradiates the sheet S through the first exposure glass 45 or the second exposure glass 46. The light reflected by the sheet S is deflected by the mirrors mounted on the first carriage 41 and the second carriage 42, respectively, and enters the image forming lens 43 to form an image in the imaging device 44 that produces image data.

For example, while the light source is energized, the first carriage 41 moves at a speed that is twice as great as a speed of the second carriage 42 to allow the light to irradiate and scan the sheet S placed on the second exposure glass 46. While the light irradiates the sheet S, the imaging device 44 reads the image on the sheet S. Thus, the image scanner 4 performs stationary original reading, that is, flat bed scanning.

The first carriage 41 halts at a home position immediately below the first exposure glass 45. While an optical system including the light source and the mirrors halts, the first carriage 41 reads the image on the first side of the sheet S conveyed by the ADF 5. Thus, the image scanner 4 performs moving original reading, that is, document feeding (DF) scanning.

In addition to the first side reader 40 situated inside the image scanner 4, the image forming apparatus 1 includes a second side reader 48 situated inside the ADF 5. The second side reader 48 reads an image on a second side (e.g., a back side) of the sheet S after the sheet S passes through the first exposure glass 45.

A detailed description is now given of a construction of the ADF 5.

The ADF 5 is coupled to a top face of the body 1M such that the ADF 5 is pivotable about a hinge. As the ADF 5 is lifted, the ADF 5 moves to an open position where the ADF 5 exposes the first exposure glass 45 and the second exposure glass 46 of the image scanner 4. Conversely, as the ADF 5 is lowered, the ADF 5 moves to a close position where the ADF 5 covers the first exposure glass 45 and the second exposure glass 46.

Figure 2:
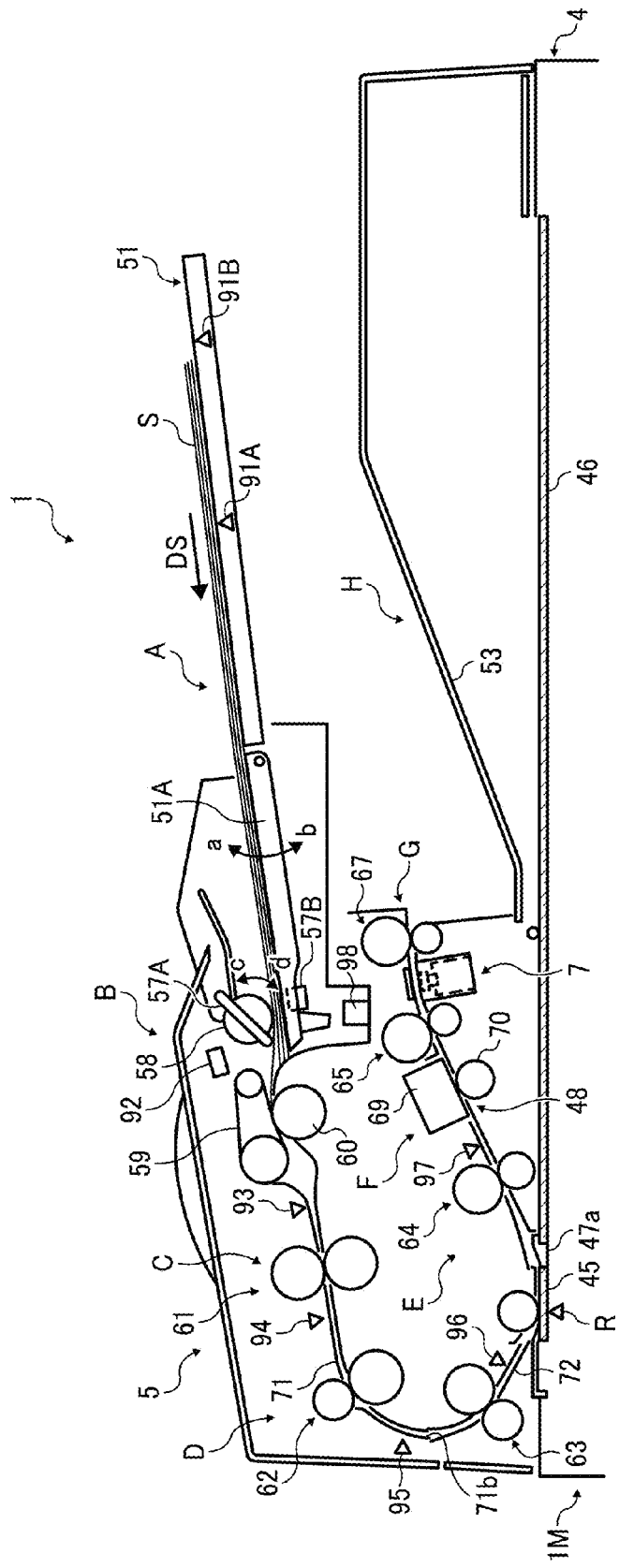
FIG. 2 is a cross-sectional view of an auto document feeder incorporated in the image forming apparatus depicted in FIG. 1.
Figure 3:
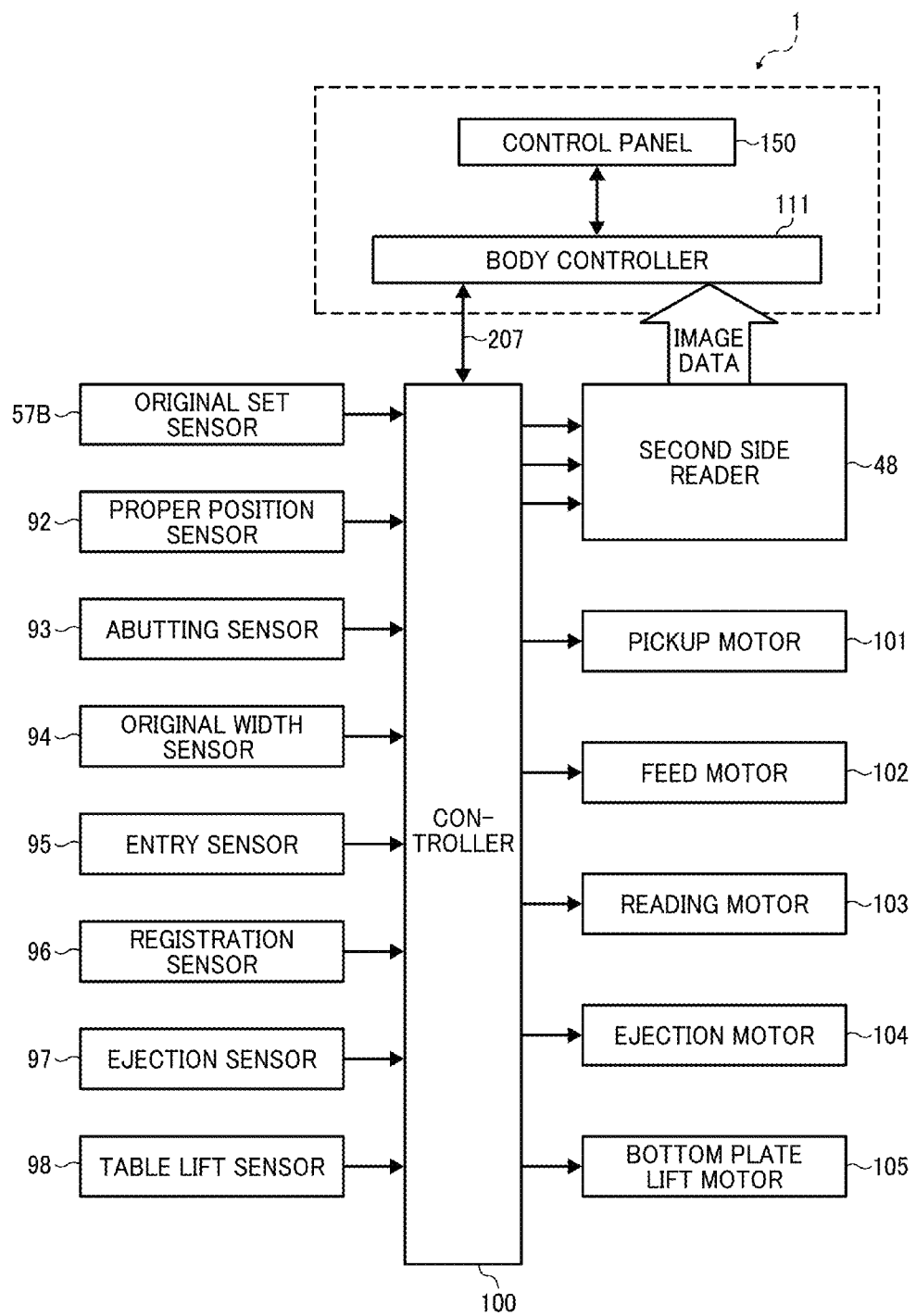
FIG. 3 is a block diagram of the image forming apparatus depicted in FIG. 1, illustrating control of the auto document feeder depicted in FIG. 2.
Figure 4:
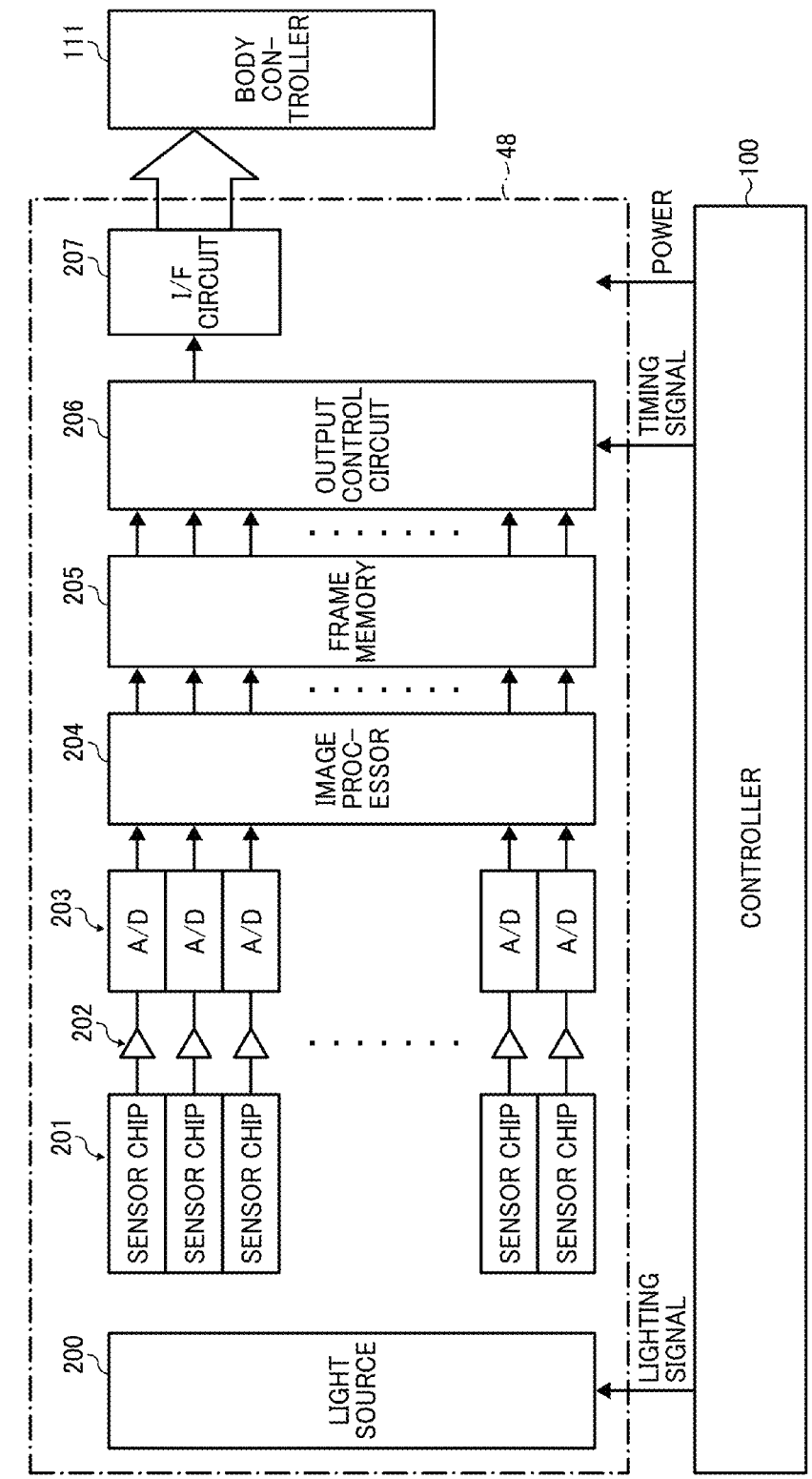
FIG. 4 is a block diagram of the image forming apparatus depicted in FIG. 1, illustrating transmission of signals between the auto document feeder depicted in FIG. 2 and a body of the image forming apparatus.

Referring to FIGS. 2 to 4, a description is provided of the construction of the ADF 5 in more detail.

FIG. 2 is a cross-sectional view of the ADF 5. FIG. 3 is a block diagram of the image forming apparatus 1, illustrating control of the ADF 5. FIG. 4 is a block diagram of the image forming apparatus 1, illustrating transmission of signals between the ADF 5 and the body M1 of the image forming apparatus 1.

As illustrated in FIG. 2, the ADF 5 employs a sheet-through feeding method and includes an original set portion A, a separate-feed portion B, a registration portion C, a turn portion D, a first read-convey portion E, a second read-convey portion F, an ejection portion G, and a stack portion H. The original set portion A loads a plurality of sheets S facing up, each of which bears an image to be read at least on the first side of the sheet S. For duplex printing, an image on the second side of the sheet S faces down. The separate-feed portion B separates a single sheet S from other sheets S and feeds the single sheet S to the registration portion C. The registration portion C contacts and halts the sheet S temporarily to correct skew of the sheet S and feeds the sheet S to the turn portion D. The turn portion D turns the sheet S to direct the image on the sheet S to face down and conveys the sheet S to the first read-convey portion E. The first read-convey portion E allows the image on the sheet S to be read by the image scanner 4 through the first exposure glass 45 and conveys the sheet S to the second read-convey portion F. The second read-convey portion F reads the image on the second side of the sheet S and conveys the sheet S to the ejection portion G. The ejection portion G ejects the sheet S to an outside of the ADF 5. The stack portion H receives and stacks the sheet S.

As illustrated in FIG. 3, the image forming apparatus 1 further includes a plurality of drivers that drives the original set portion A, the separate-feed portion B, the registration portion C, the turn portion D, the first read-convey portion E, the second read-convey portion F, and the ejection portion G to convey the sheet S, that is, a pickup motor 101, a feed motor 102, a reading motor 103, an ejection motor 104, and a bottom plate lift motor 105. The image forming apparatus 1 further includes a controller 100 that controls the pickup motor 101, the feed motor 102, the reading motor 103, the ejection motor 104, and the bottom plate lift motor 105.

A detailed description is now given of a construction of the original set portion A.

As illustrated in FIG. 2, a user places the plurality of sheets S on an original table 51 incorporating a movable original table 51A such that the image on the first side of each sheet S faces up. The user moves a side guide in a width direction of the sheets S that is perpendicular to a sheet conveyance direction DS to restrict and position the sheets S in the width direction thereof. A set feeler 57A and an original set sensor 57B detect the position of the sheet S and send a signal to a body controller 111 through an interface (I/F) circuit 207 depicted in FIG. 3.

A plurality of original length sensors 91A and 91B mounted on the original table 51 detects a schematic length of the sheet S in the sheet conveyance direction DS. Each of the original length sensors 91A and 91B is a reflection sensor or an actuator type sensor that detects the sheet S even when the single sheet S is placed on the original table 51.

The bottom plate lift motor 105 depicted in FIG. 3 lifts and lowers the movable original table 51A in directions a and b depicted in FIG. 2. As the set feeler 57A and the original set sensor 57B detect the sheet S placed on the original table 51, the controller 100 rotates the bottom plate lift motor 105 forward to lift the movable original table 51A until an uppermost sheet S of the plurality of sheets S placed on the original table 51 contacts a pickup roller 58.

A proper position sensor 92 detects the uppermost sheet S lifted by the movable original table 51A to a proper height. When the proper position sensor 92 is turned on, the controller 100 controls the bottom plate lift motor 105 to stop the movable original table 51A. When the sheets S are fed repeatedly and the height of the uppermost sheet S is lowered gradually, the proper position sensor 92 is turned off. The controller 100 controls the bottom plate lift motor 105 to lift the movable original table 51A repeatedly until the proper position sensor 92 is turned on again. Thus, the uppermost sheet S is retained at the proper height constantly.

When the sheets S have been fed from the original table 51 and therefore the original table 51 is clear, the controller 100 rotates the bottom plate lift motor 105 backward to lower the movable original table 51A to a home position where the user sets a next sheaf of sheets S on the original table 51.

The pickup motor 101 and a cam rotate the pickup roller 58 in directions c and d depicted in FIG. 2. As the movable original table 51A is lifted, the uppermost sheet S placed on the movable original table 51A pushes up the pickup roller 58 in the direction c so that the proper position sensor 92 detects the uppermost sheet S. The user presses a key on a control panel 150 depicted in FIG. 3 to select a one-sided print mode to form a toner image on one side of a sheet P or a two-sided print mode to form a toner image on both sides of a sheet P. Thereafter, the user presses a print key on the control panel 150 to start printing. As an original feeding signal is transmitted from the body controller 111 to the controller 100 through the interface circuit 207, the controller 100 rotates the feed motor 102 forward to drive and rotate the pickup roller 58. Thus, the pickup roller 58 picks up several sheets S, preferably a single sheet S, from the plurality of sheets S placed on the original table 51. The pickup roller 58 rotates in a rotation direction that directs the uppermost sheet S to an original inlet of the separate-feed portion B.

The user may select the one-sided print mode or the two-sided print mode for a whole sheaf of sheets S placed on the original table 51. Alternatively, the user may select different modes for a part and another part of the sheaf of sheets S. For example, when ten sheets S are placed on the original table 51, the user may select the two-sided print mode for a first sheet S and a tenth sheet S and the one-sided print mode for second to ninth sheets S.

A detailed description is now given of a construction of the separate-convey portion B.

The controller 100 rotates the feed motor 102 forward to drive and rotate a feed belt 59 in the sheet conveyance direction DS. The controller 100 rotates the feed motor 102 forward to drive and rotate a reverse roller 60 in a direction opposite the sheet conveyance direction DS. Accordingly, the reverse roller 60 separates the uppermost sheet S from underneath sheets S to feed the uppermost sheet S to the registration portion C. For example, while the reverse roller 60 is in direct contact with and pressed against the feed belt 59 with given pressure or the reverse roller 60 is pressed against the feed belt 59 via the single sheet S, the reverse roller 60 rotates counterclockwise in FIG. 2 in accordance with rotation of the feed belt 59. If two or more sheets S enter a nip formed between the feed belt 59 and the reverse roller 60 accidentally, a rotation force of the feed belt 59 that rotates the reverse roller 60 is set to be smaller than a torque of a torque limiter. Accordingly, the reverse roller 60 rotates clockwise in FIG. 2 in a default rotation direction to feed back the underneath sheets S to the original table 51, preventing multiple feeding of the sheets S.

The feed belt 59 conveys the uppermost sheet S separated from the underneath sheets S by the feed belt 59 and the reverse roller 60 to an abutting sensor 93. The abutting sensor 93 detects a leading edge of the sheet S.

A detailed description is now given of a construction of the registration portion C.

The sheet S is conveyed to a pullout roller pair 61 and the leading edge of the sheet S comes into contact with the pullout roller pair 61 that is halted. The sheet S is further conveyed for a given amount after the abutting sensor 93 detects the sheet S. When the sheet S is pressed against the pullout roller pair 61 and bent for a given amount, the controller 100 halts the feed motor 102 to halt the feed belt 59. The controller 100 rotates the pickup motor 101 to retract the pickup roller 58 from an upper face of the sheet S to cause the feed belt 59 to convey the sheet S. As the leading edge of the sheet S enters a nip formed between an upper roller and a lower roller constructing the pullout roller pair 61, the pullout roller pair 61 contacts the leading edge of the sheet S to correct skew of the sheet S.

The pullout roller pair 61 corrects skew of the sheet S and conveys the sheet S to an intermediate roller pair 62. The controller 100 rotates the feed motor 102 backward to drive and rotate the pullout roller pair 61. While the feed motor 102 rotates backward, the pullout roller pair 61 and the intermediate roller pair 62 are driven and the pickup roller 58 and the feed belt 59 are not driven. The pullout roller pair 61, the intermediate roller pair 62, the pickup roller 58, and the feed belt 59 serve as a conveyer that conveys the sheet S.

A detailed description is now given of a construction of the turn portion D.

A plurality of original width sensors 94 is aligned in a depth direction of the ADF 5 that is parallel to the width direction of the sheet S and perpendicular to the sheet conveyance direction DS. The original width sensors 94 detect a width of the sheet S in the width direction thereof that is conveyed by the pullout roller pair 61. The controller 100 calculates a length of the sheet S in the sheet conveyance direction DS based on a motor pulse defined when the abutting sensor 93 detects the leading edge and a trailing edge of the sheet S.

While the pullout roller pair 61 and the intermediate roller pair 62 are driven and rotated to convey the sheet S from the registration portion C to the turn portion D, a conveyance speed at which the sheet S is conveyed through the registration portion C is higher than a conveyance speed at which the sheet S is conveyed through the first read-convey portion E to shorten a conveyance time to convey the sheet S to the first read-convey portion E.

A detailed description is now given of a construction of the first read-convey portion E.

When an entry sensor 95 detects the leading edge of the sheet S, before the leading edge of the sheet S enters a nip formed between an upper roller and a lower roller constructing an entry roller pair 63, the controller 100 starts decreasing the conveyance speed of the sheet S to cause a conveyance speed at which the entry roller pair 63 conveys the sheet S through the first read-convey portion E to be equivalent to a conveyance speed at which the first read-convey portion E conveys the sheet S while reading the image on the sheet S. Simultaneously, the controller 100 rotates the reading motor 103 forward to drive and rotate the entry roller pair 63, an exit roller pair 64, and a contact image sensor (CIS) exit roller pair 65. When a registration sensor 96 detects the leading edge of the sheet S, the conveyance speed of the sheet S is decreased while the sheet S is conveyed for a given distance. When the sheet S halts temporarily before a reading position R, the controller 100 transmits a registration position stop signal to the body controller 111 through the interface circuit 207. When the controller 100 receives a reading start signal from the body controller 111, the sheet S halted at a registration position is conveyed at an accelerated speed so that the sheet S is conveyed at a given conveyance speed before the leading edge of the sheet S reaches the reading position R. At a time when the leading edge of the sheet S detected by a pulse count of the reading motor 103 reaches the reading position R, the controller 100 transmits a gate signal indicating a valid imaged region in a sub-scanning direction on the first side of the sheet S to the body controller 111 until the trailing edge of the sheet S passes through the reading position R.

A detailed description is now given of a construction of the ejection portion G and the stack portion H.

In the one-sided print mode, the sheet S having passed through the first read-convey portion E is conveyed to the ejection portion G through the second side reader 48. When an ejection sensor 97 detects the leading edge of the sheet S, the controller 100 rotates the ejection motor 104 forward to rotate an ejection roller pair 67 counterclockwise in FIG. 2. Based on a pulse count of the ejection motor 104 counted after the ejection sensor 97 detects the leading edge of the sheet S, the controller 100 decreases a rotation speed of the ejection motor 104 immediately before the trailing edge of the sheet S is ejected from a nip formed between an upper roller and a lower roller constructing the ejection roller pair 67, thus preventing the sheet S ejected by the ejection roller pair 67 onto an ejection tray 53 from protruding beyond the ejection tray 53. The entry roller pair 63, the exit roller pair 64, the CIS exit roller pair 65, and the ejection roller pair 67 serve as a conveyer that conveys the sheet S.

A detailed description is now given of a construction of the second read-convey portion F.

In the two-sided print mode, at a time when the leading edge of the sheet S reaches the second side reader 48, which is determined based on a pulse count of the reading motor 103 counted after the ejection sensor 97 detects the leading edge of the sheet S, the controller 100 transmits a gate signal indicating a valid imaged region in the sub-scanning direction on the second side of the sheet S to the second side reader 48 until the trailing edge of the sheet S passes through the second read-convey portion F. A second reading roller 70 prevents the sheet S from being lifted while the sheet S is conveyed through the second side reader 48. The second reading roller 70 also serves as a reference white portion to obtain shading data in the second side reader 48.

Referring to FIG. 3, a description is provided of a configuration that controls an operation of the ADF 5.

As illustrated in FIG. 3, the image forming apparatus 1 includes the controller 100 that controls the ADF 5, the body controller 111 that controls the components disposed inside the body 1M depicted in FIG. 1, and the control panel 150 coupled to the body controller 111.

The controller 100 receives a detection signal sent from each of the original set sensor 57B, the proper position sensor 92, a table lift sensor 98, the abutting sensor 93, the original width sensors 94, the entry sensor 95, the registration sensor 96, and the ejection sensor 97.

The controller 100 drives the pickup motor 101 that drives and rotates the pickup roller 58, the feed motor 102 that drives and rotates the feed belt 59, the pullout roller pair 61, and the intermediate roller pair 62, and the reading motor 103 that drives and rotates the entry roller pair 63, the exit roller pair 64, and the CIS exit roller pair 65. The controller 100 drives the ejection motor 104 that drives and rotates the ejection roller pair 67 and the bottom plate lift motor 105 that lifts the movable original table 51A.

As illustrated in FIG. 4, the controller 100 sends a timing signal and the like to the second side reader 48. The timing signal notifies a time when the leading edge of the sheet S reaches a reading position where a second side scanning unit 69 reads the image on the second side of the sheet S. Image data created after the timing signal is recognized as valid data.

The controller 100 is connected to the body controller 111 through the interface circuit 207. When the user presses the print key on the control panel 150, the body controller 111 sends an original feed signal and a reading start signal to the controller 100 through the interface circuit 207.

Referring to FIG. 4, a description is provided of a signal path between the ADF 5 and the body M1 of the image forming apparatus 1.

As illustrated in FIG. 4, the second side reader 48 includes a light source 200 including a light-emitting diode (LED) array, a fluorescent lamp, a cold cathode tube, or the like. The light source 200 emits light onto the sheet S according to a lighting signal sent from the controller 100. The second side reader 48 receives from the controller 100 the timing signal that notifies the time when the leading edge of the sheet S reaches the reading position where the second side scanning unit 69 reads the image on the second side of the sheet S. The second side reader 48 also receives power to be supplied to the light source 200.

The second side reader 48 further includes a plurality of sensor chips 201, a plurality of operational (OP) amplifier circuits 202, and a plurality of analog digital (A/D) converters 203. The plurality of sensor chips 201 is aligned in a main scanning direction. The plurality of OP amplifier circuits 202 is coupled to the plurality of sensor chips 201, respectively. The plurality of A/D converters 203 is coupled to the plurality of OP amplifier circuits 202, respectively. The second side reader 48 further includes an image processor 204, a frame memory 205, an output control circuit 206, and the interface circuit 207.

The sensor chip 201 includes a photoelectric transducer called an equal magnification contact image sensor and a condenser lens. The condenser lens of each of the plurality of sensor chips 201 condenses reflection light reflected by the second side of the sheet S into the photoelectric transducer which reads the light into image data.

The OP amplifier circuits 202 amplify the image data created by the sensor chips 201, respectively. Thereafter, the A/D converters 203 convert the amplified image data into digital image data.

The digital image data enters the image processor 204 which performs shading correction and the like on the digital image data. Thereafter, the frame memory 205 stores the digital image data temporarily. The output control circuit 206 converts the digital image data into image data having a data format acceptable by the body controller 111. Thereafter, the digital image data enters the body controller 111 through the interface circuit 207.

Figure 5:
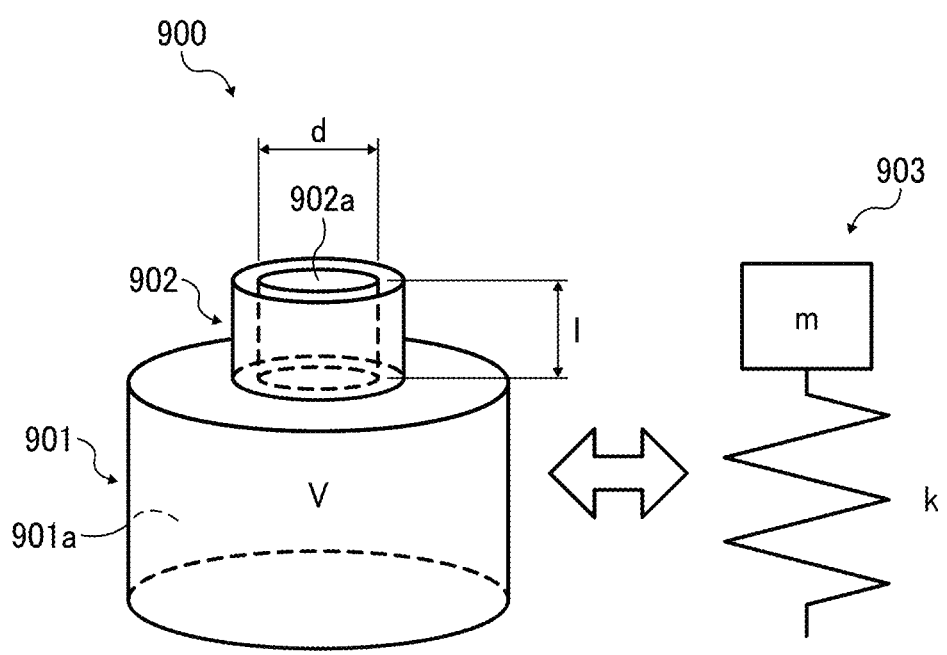
FIG. 5 is a perspective view of a Helmholtz resonator.

Referring to FIG. 5, a description is provided of a construction of a Helmholtz resonator employed by a sheet guide installed in the ADF 5.

FIG. 5 is a perspective view of a Helmholtz resonator 900.

As illustrated in FIG. 5, the Helmholtz resonator 900 includes a body 901 including a cavity 901a having a volume V and a neck 902 including a through-hole 902a having a diameter d and a length 1. As a sonic wave enters the through-hole 902a from an outside of the Helmholtz resonator 900, the sonic wave involves air in the through-hole 902a into the cavity 901a while the sonic wave presses the air into the cavity 901a. Pressure sealed inside the body 901 increases and presses the air back to the through-hole 902a. Although the air is pressed back to the outside of the through-hole 902a, the air returns to the through-hole 902a by inertia. Such repeated motion of the air defines a spring 903 with simple harmonic oscillation, which has a mass m and a spring constant k. Hence, a resonance frequency f is calculated by a following formula (1). Even if the neck 902 includes a plurality of through-holes 902a that corresponds to the single cavity 901a, cross-sectional areas of the through-holes 902a, respectively, are combined into a cross-sectional area S in the formula (1) to calculate the resonance frequency f.

$$f = \frac{C}{2\pi}\sqrt{\frac{S}{(l+\delta)V}} \qquad (1)$$

In the formula (1), f represents the resonance frequency in hertz (Hz). C represents a sound velocity in meter per second (m/s). S represents a cross-sectional area of the through-hole 902a in square meter (m). l represents a length of the through-hole 902a in meter (m). δ represents a correction factor by an opening edge in meter (m). V represents a volume of the cavity 901a in cubic meter ($m^3$).

The air inside the through-hole 902a vibrates aggressively at a frequency near the resonance frequency. However, in a boundary layer in proximity to a wall of the through-hole 902a, the air serving as a fluid receives a viscous resistance. Accordingly, vibration energy is converted into thermal energy by the viscous resistance. Consequently, sound energy generated by the sonic wave that enters the Helmholtz resonator 900 from the outside thereof is converted into thermal energy, decreasing sound energy and attaining sound absorption.

Figure 6:
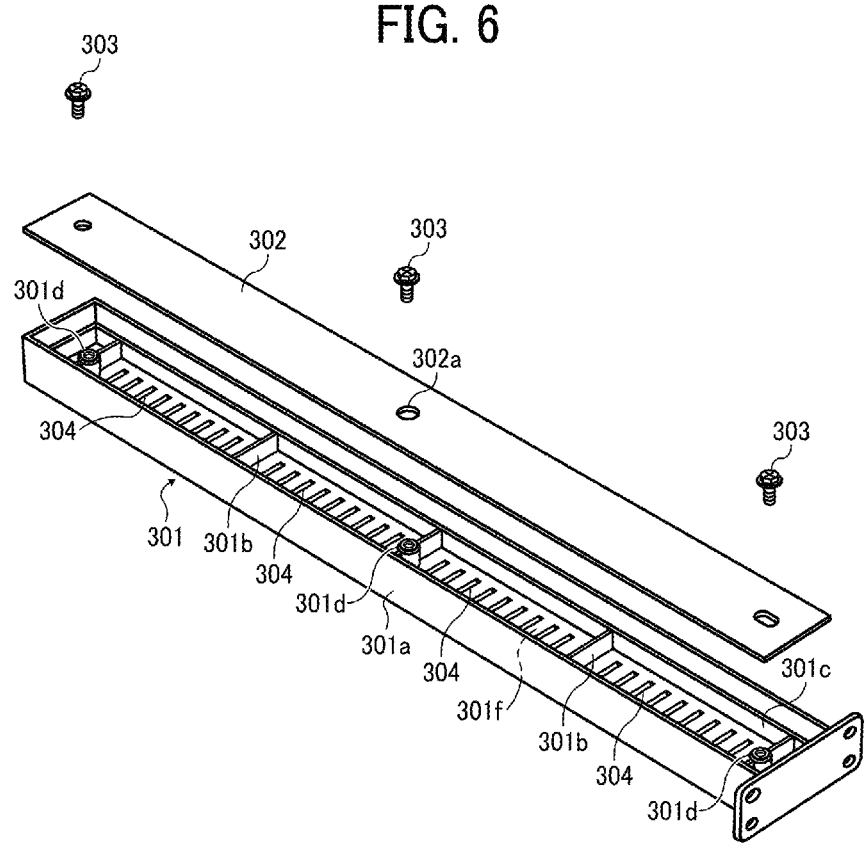
FIG. 6 is an exploded perspective view of a sheet guide incorporated in the auto document feeder depicted in FIG. 2.
Figure 7:
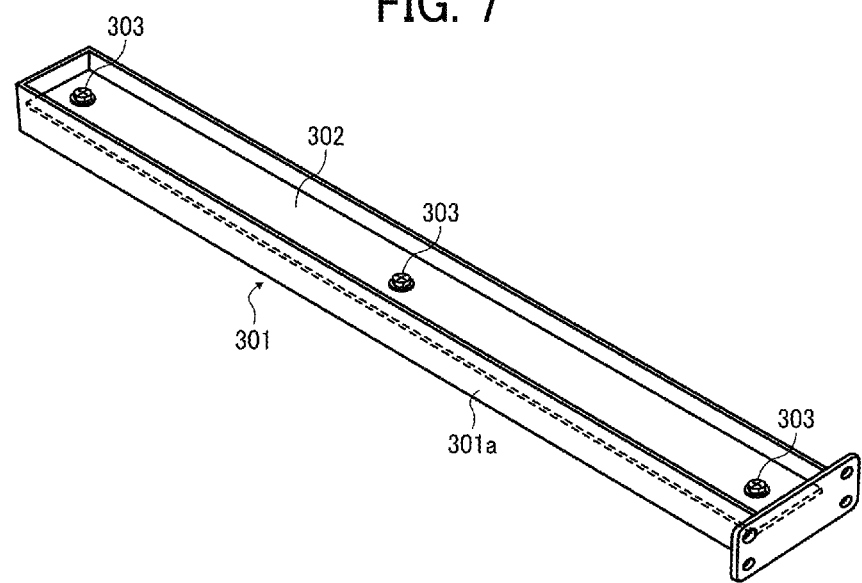
FIG. 7 is a perspective view of the sheet guide depicted in FIG. 6.
Figure 8:
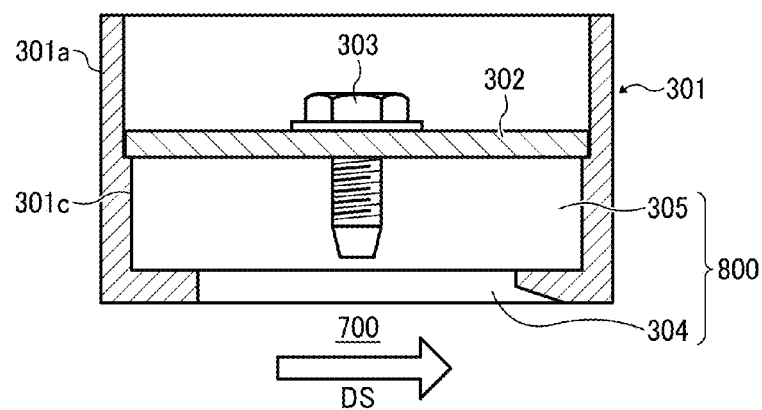
FIG. 8 is a cross-sectional view of the sheet guide depicted in FIG. 7.

Referring to FIGS. 6 to 8, a description is provided of a resonator of a sheet guide 301 incorporated in the ADF 5.

FIG. 6 is an exploded perspective view of the sheet guide 301. FIG. 7 is a perspective view of the sheet guide 301. FIG. 8 is a cross-sectional view of the sheet guide 301.

As illustrated in FIG. 6, the sheet guide 301 includes a guide face 301f that guides the sheet S in a given direction (e.g., the sheet conveyance direction DS) and a plurality of through-holes 304 (e.g., a plurality of slits) penetrating through the guide face 301f. The sheet guide 301 is a box contoured by a perimeter wall 301a that defines an outer perimeter of the sheet guide 301. A plurality of reinforcing ribs 301b is disposed inside the box defined by the perimeter wall 301a. The perimeter wall 301a and the reinforcing ribs 301b prevent the sheet guide 301 from being deformed by the sheet S that comes into contact with the sheet guide 301.

According to this example embodiment, a height of the reinforcing rib 301b is substantially a half of a height of the perimeter wall 301a. Alternatively, the height of the reinforcing rib 301b may vary depending on the volume or the like of a cavity 305 depicted in FIG. 8 that absorbs sound. According to this example embodiment, the sheet guide 301 incorporates five reinforcing ribs 301b. However, the number of the reinforcing ribs 301b is not limited to five.

An interior wall 301c is disposed inside the perimeter wall 301a. The interior wall 301c is stepped down from and lower than the perimeter wall 301a such that the interior wall 301c has a height equivalent to the height of the reinforcing rib 301b. As illustrated in FIG. 7, a seal 302 is mounted on the interior wall 301c to seal the sheet guide 301 with no gap.

As illustrated in FIG. 6, a plurality of through-holes 302a penetrates through the seal 302. A plurality of screw bearings 301d is mounted on the plurality of reinforcing ribs 301b, respectively. A plurality of screws 303 is inserted into the plurality of screw bearings 301d through the plurality of through-holes 302a, respectively, to fasten the seal 302 to the perimeter wall 301a of the sheet guide 301. Thus, as illustrated in FIG. 8, the perimeter wall 301a and the seal 302 define the cavity 305 that faces a back face of a sheet conveyance path 700. The cavity 305 communicates with the sheet conveyance path 700 through the through-hole 304. The sheet guide 301 incorporates at least one through-hole 304. The cavity 305 and the through-hole 304 construct the Helmholtz resonator. The through-hole 304 serves as a communication through-hole. The cavity 305 serves as a cavity or a hollow. The through-hole 304 and the cavity 305 construct a sound absorber 800.

As illustrated in FIG. 6, the through-hole 304 is a rectangular elongate slit. The through-hole 304 formed into the slit achieves an advantage of decreasing noise as the plurality of through-holes 304 is aligned with a slight interval between the adjacent through-holes 304 to increase a combined cross-sectional area of the through-holes 304.

Figure 9:
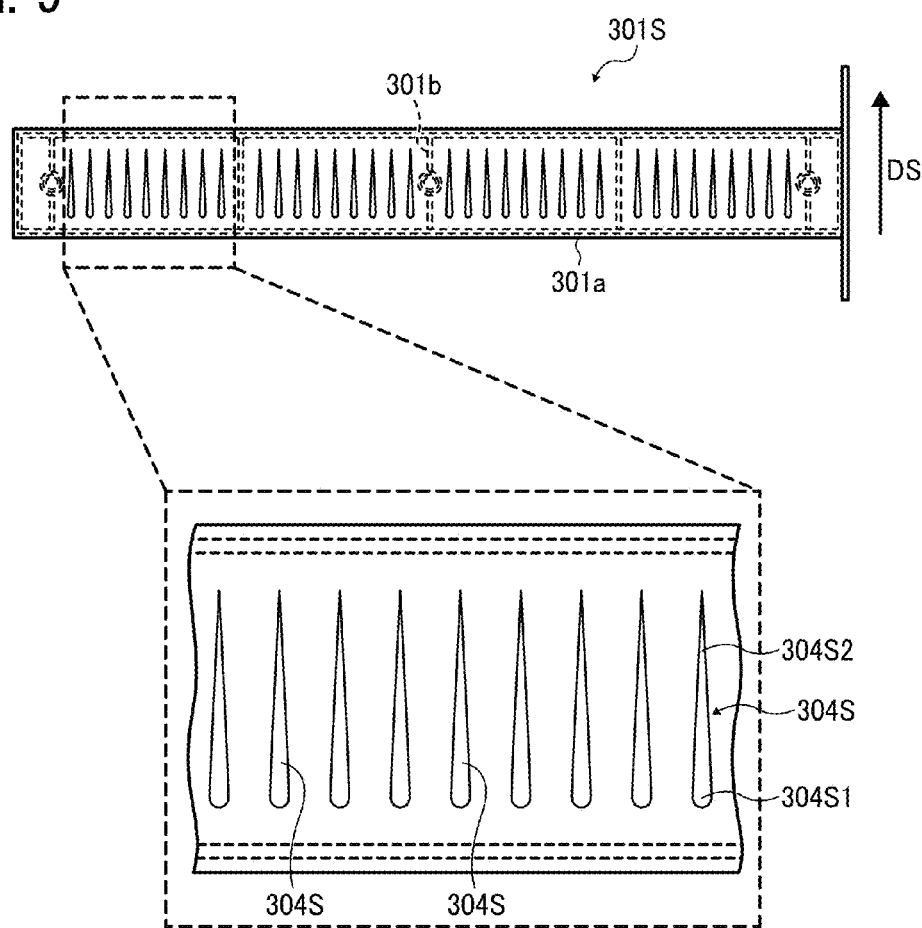
FIG. 9 is a plan view of a sheet guide as a variation of the sheet guide depicted in FIG. 6.

Referring to FIG. 9, a description is provided of a variation of the through-hole 304.

FIG. 9 is a plan view of a sheet guide 301S incorporating a through-hole 304S as the variation of the through-hole 304 depicted in FIG. 6. As illustrated in FIG. 9, the through-hole 304S has a drop shape. Alternatively, the through-hole 304S may be circular or may have other shapes. The through-hole 304S includes an upstream portion 304S1 that is semicircular and a downstream portion 304S2 that is an acute angled triangle. The downstream portion 304S2 is disposed downstream from the upstream portion 304S1 in the sheet conveyance direction DS and adjoins the semicircular upstream portion 304S1. The through-hole 304S having the drop shape precisely prevents the sheet S conveyed in the sheet conveyance direction DS from being caught by the sheet guide 301.

A description is provided of a construction of a first comparative image forming apparatus.

The first comparative image forming apparatus includes a sheet outlet and a duct disposed in proximity to the sheet outlet. A resonant cavity adjoins an aperture disposed opposite a recording sheet. The duct attenuates noise that generates from a printing device and moves through an ejection path adjoining the sheet outlet. The resonant cavity reduces the noise by Helmholtz resonance.

A description is provided of a construction of a second comparative image forming apparatus.

The second comparative image forming apparatus includes a recording head, a pull-up roller that conveys a recording medium, and a pull-up roller cover that presses the recording medium against the pull-up roller. The pull-up roller cover includes a duct and an inlet disposed opposite a recording medium conveyance path. The duct and the inlet attenuate noise that generates from the recording head.

The first comparative image forming apparatus and the second comparative image forming apparatus attenuate noise generated by the printing device and the printing head, respectively. Additionally, a noise generator (e.g., the printing device and the printing head) is spaced apart from a noise attenuator (e.g., the duct and the resonant cavity of the first comparative image forming apparatus and the duct and the inlet of the second comparative image forming apparatus) in a recording medium conveyance direction. Accordingly, a part of the noise may diffuse inside the first comparative image forming apparatus and the second comparative image forming apparatus before the noise reaches the noise attenuator. Consequently, the noise attenuator may not attenuate the noise sufficiently.

To address those circumstances of the first comparative image forming apparatus and the second comparative image forming apparatus, the image forming apparatus 1 depicted in FIG. 1 includes a sheet conveying device 7 described below that attenuates slide noise that generates while a sheet (e.g., an original sheet, that is, the sheet S, and a recording sheet, that is, the sheet P) is conveyed through the sheet conveying device 7, for example, while the sheet conveyed through the sheet conveying device 7 slides over a component disposed inside the sheet conveying device 7. The sheet conveying device 7 is installed in an image reading device (e.g., the image reading device 6) incorporating an auto document feeder (e.g., the ADF 5) or an image forming apparatus (e.g., the image forming apparatus 1) that forms an image on a recording medium according to image data created by the image reading device. Alternatively, the sheet conveying device 7 may be installed in an image forming apparatus that forms an image by inkjet printing or other machines that convey a sheet.

Figure 10:
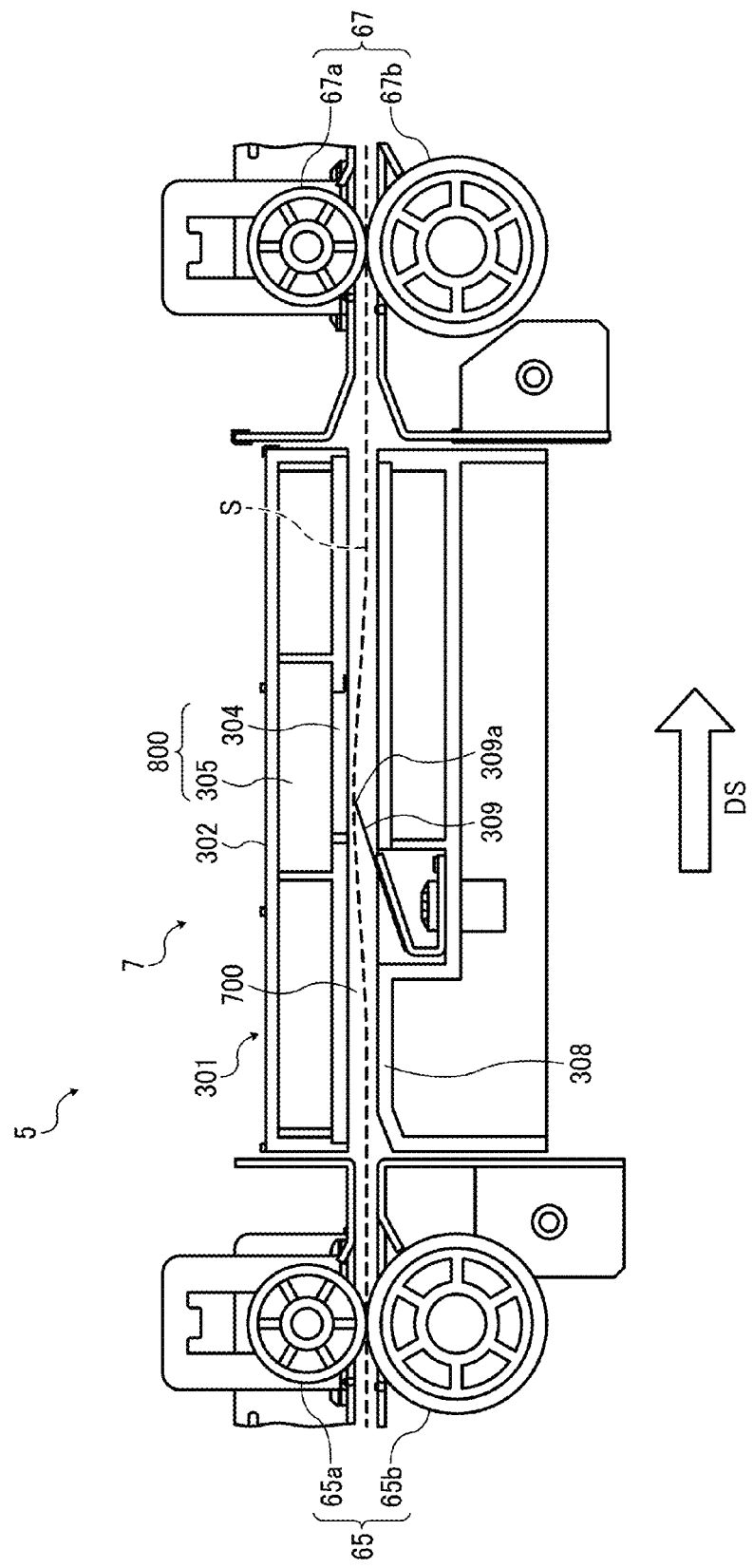
FIG. 10 is a partial cross-sectional view of the auto document feeder depicted in FIG. 2, illustrating a sheet conveying device incorporated therein.

Referring to FIG. 10, a description is provided of one example of the sheet conveying device 7 incorporating the sheet guide 301 that generates Helmholtz resonance and a sheet guide 308.

The sheet conveying device 7 is installed in the ADF 5 depicted in FIG. 2 at a position in proximity to the ejection portion G. FIG. 10 is a partial cross-sectional view of the ADF 5.

The upstream, CIS exit roller pair 65 conveys the sheet S in the sheet conveyance direction DS to the downstream, ejection roller pair 67 through the sheet conveyance path 700 defined by the sheet guide 301, the sheet guide 308, and a subsidiary guide 309. The sheet guide 308 and the subsidiary guide 309 are disposed opposite the sheet guide 301. The sheet guide 301, the sheet guide 308, and the subsidiary guide 309 guide the sheet S to the ejection roller pair 67. The CIS exit roller pair 65 includes an upper roller 65a and a lower roller 65b. The ejection roller pair 67 includes an upper roller 67a and a lower roller 67b.

The sheet guide 308 is disposed opposite the sheet guide 301. While the sheet S is conveyed through the sheet conveyance path 700, the sheet S slides over the sheet guide 308. The subsidiary guide 309 directs and bends the sheet S upward, changing the sheet conveyance direction DS. The sheet guide 301 serves as a primary sheet guide. The sheet guide 308 serves as a secondary sheet guide. The subsidiary guide 309 serves as a bending portion.

While the sheet S is conveyed through the sheet conveyance path 700, the sheet S comes into contact with the sheet guides 301 and 308 frictionally, generating noise that is hereinafter referred to as slide noise. The slide noise may generate when a surface and an edge of the sheet S comes into contact with a surface of the respective sheet guides 301 and 308. The subsidiary guide 309 includes an edge 309a disposed at a downstream end of the subsidiary guide 309 in the sheet conveyance direction DS. When the sheet S comes into contact with the edge 309a of the relatively rigid subsidiary guide 309, substantial slide noise may generate because the edge 309a changes a curvature of the subsidiary guide 309 sharply. Compared to the surface of the sheet S that comes into surface contact with the surface of the sheet guide 308, as the surface of the sheet S comes into linear contact with a line of the subsidiary guide 309, the sheet S is exerted with a substantial impact locally. The slide noise generates and diffuses in every direction from the linear edge 309a of the subsidiary guide 309 and a periphery of the edge 309a that serves as a sound source linearly extending in the depth direction (e.g., the main scanning direction) perpendicular to the sheet conveyance direction DS.

A description is provided of a concept of placement of the sheet guide 301 that generates Helmholtz resonance with respect to the sound source described above.

If the sheet guide 301 is spaced apart from the sound source with an increased interval therebetween, a part of sound diffused from the sound source enters the cavity 305 of the sheet guide 301. Accordingly, a part of energy of the diffused sound is converted into thermal energy. Consequently, sound absorption is limited. To address this circumstance, the through-hole 304 serving as an inlet to the cavity 305 of the sheet guide 301 covers the sound source in an increased area thereof. For example, as illustrated in FIG. 10, the through-hole 304 serving as the inlet to the cavity 305 through which sound enters the cavity 305 overlaps the edge 309a serving as the sound source in the sheet conveyance direction DS. That is, the through-hole 304 is disposed opposite the edge 309a of the subsidiary guide 309 directly in a vertical direction perpendicular to the sheet conveyance direction DS. For example, the through-hole 304 is disposed opposite the edge 309a directly in the vertical direction perpendicular to the sheet conveyance direction DS with no component (e.g., an obstacle that shields the through-hole 304 from the edge 309a) therebetween.

Even if the through-hole 304 is disposed opposite the sound source in the vertical direction perpendicular to the sheet conveyance direction DS, if the through-hole 304 is spaced apart from the sound source with an increased interval therebetween, the through-hole 304 may receive a part of sound diffused from the sound source. To address this circumstance, the through-hole 304 is disposed in proximity to the edge 309a serving as the sound source to decrease an interval between the edge 309a and the through-hole 304. Accordingly, the through-hole 304 absorbs the slide noise that generates while the sheet S slides over the edge 309a directly from the edge 309a. For example, the through-hole 304 absorbs the slide noise generated by the edge 309a directly from the edge 309a with no obstacle therebetween that shields the through-hole 304 from the edge 309a and blocks the slide noise from the edge 309a.

Figure 11:
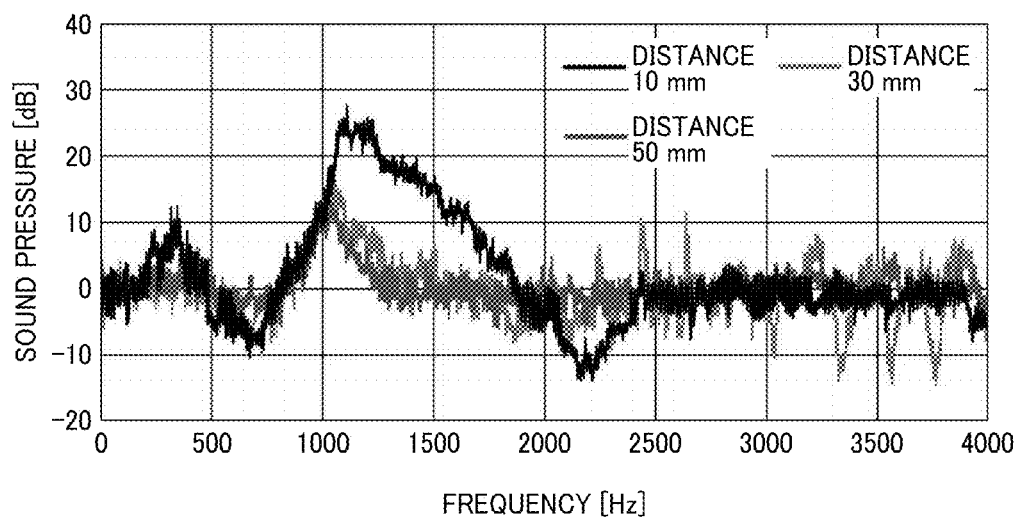
FIG. 11 is a graph illustrating a relation between a distance from a sound source to a through-hole incorporated in the sheet guide depicted in FIG. 8 that absorbs sound and a sound absorption level.

FIG. 11 is a graph illustrating a relation between a distance from the sound source to the through-hole 304 that absorbs sound and a sound absorption level. As illustrated in FIG. 11, if the distance from the sound source to the through-hole 304 exceeds 10 mm, the sound absorption level degrades substantially.

As described above, the through-hole 304 may have an increased area to absorb an increased amount of sound diffused from the sound source. However, the increased area of the through-hole 304 increases the resonance frequency f calculated by the formula (1). To address this circumstance, a width of the through-hole 304 increases in the depth direction perpendicular to the sheet conveyance direction DS or the volume of the cavity 305 increases. However, as described above in the description of Helmholtz resonance, air inside the through-hole 304 is requested to move together with a sonic wave to generate resonance. Accordingly, a cross-sectional area of the through-hole 304 is requested to be smaller than a cross-sectional area of the cavity 305. A ratio of the cross-sectional area of the through-hole 304 with respect to the cross-sectional area of the cavity 305 is called an aperture ratio. The aperture ratio up to about 25 percent generates resonance. Accordingly, the cross-sectional area of the through-hole 304 is increased. The cross-sectional area of the cavity 305 is determined to attain the aperture ratio of about 25 percent. Thus, the sheet guide 301 has a compact resonance-absorption construction that enhances sound absorption.

Figure 12:
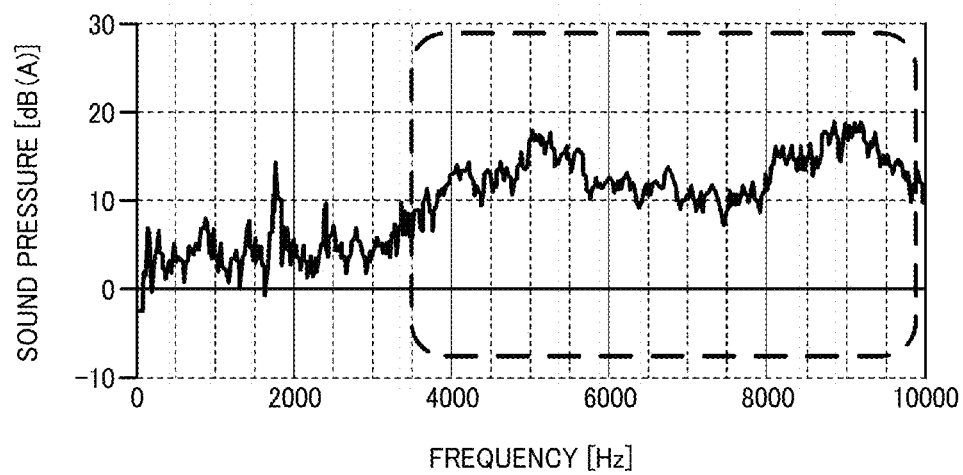
FIG. 12 is a graph illustrating a relation between a frequency of friction noise and a sound pressure level.

Since the slide noise generates by friction between the sheet S and the subsidiary guide 309, the slide noise is called friction noise. The friction noise does not have a particular frequency. FIG. 12 is a graph illustrating a relation between the frequency of the friction noise and the sound pressure level. As illustrated in FIG. 12, the friction noise has a broad frequency distribution not smaller than about 3.5 kHz. A human auditory sense is sensitive to a sound having a frequency near 4 kHz. For example, female scream and cry of a baby have the frequency near 4 kHz. If the sound having the frequency near 4 kHz is reduced, the through-hole 304 may achieve a substantial advantage against an A-weighting noise corrected for the human auditory sense. The cross-sectional area and the length of the through-hole 304 in the vertical direction perpendicular to the sheet conveyance direction DS, the volume of the cavity 305, and the like are adjusted to attain the resonance frequency of about 4 kHz according to the formula (1) above.

Figure 13:
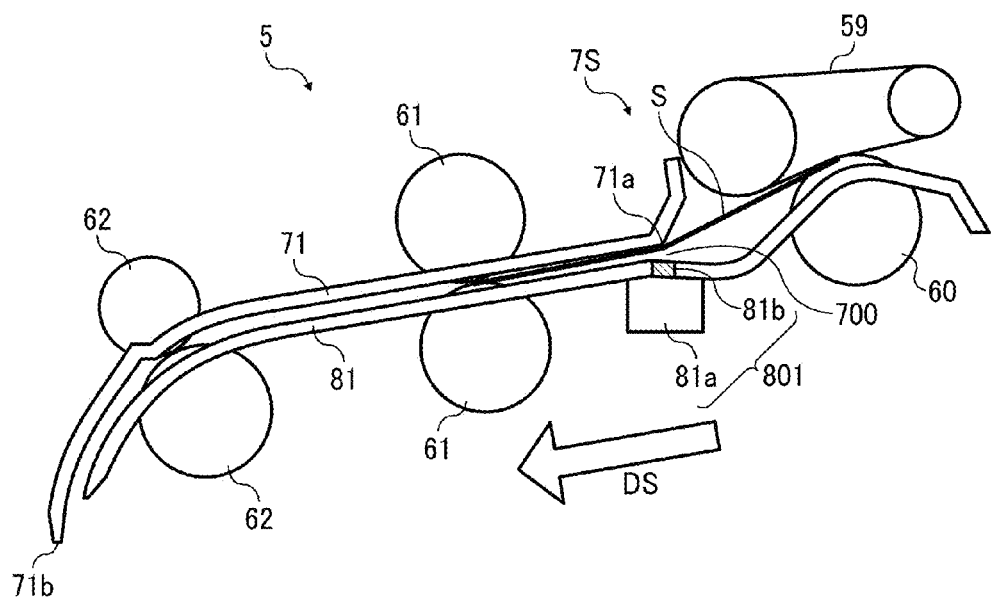
FIG. 13 is a partial cross-sectional view of the auto document feeder depicted in FIG. 2, illustrating a sheet conveying device situated at a position different from a position of the sheet conveying device depicted in FIG. 10.
Figure 14:
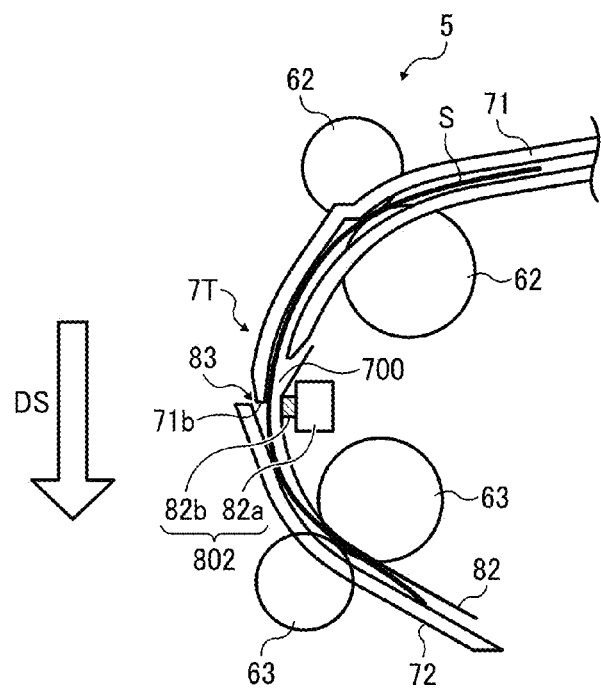
FIG. 14 is a partially enlarged cross-sectional view of the auto document feeder depicted in FIG. 2, illustrating a sheet conveying device situated at another position different from the position of the sheet conveying device depicted in FIG. 10.

The position of the sheet guide 301 is not limited to the position described above. Alternatively, the sheet guide 301 may be disposed opposite a sheet guide incorporating a bending portion that changes the sheet conveyance direction DS as illustrated in FIGS. 13 and 14. FIG. 13 is a partial cross-sectional view of the ADF 5, illustrating a sheet conveying device 7S situated at a position different from the position of the sheet conveying device 7 depicted in FIG. 10. FIG. 14 is a partially enlarged cross-sectional view of the ADF 5, illustrating a sheet conveying device 7T situated at another position different from the position of the sheet conveying device 7 depicted in FIG. 10.

When the pullout roller pair 61 of the ADF 5 depicted in FIG. 2 feeds the sheet S, the feed belt 59 halts. Hence, the two rollers of the pullout roller pair 61 that nip the sheet S stretch the sheet S in the sheet conveyance direction DS while the sheet S is conveyed in the sheet conveyance direction DS. As illustrated in FIG. 13, the sheet guide 71 spans from the feed belt 59 to the pullout roller pair 61. The sheet guide 71 includes a bending portion 71a interposed between the feed belt 59 and the pullout roller pair 61 in the sheet conveyance direction DS. As the sheet S stretched by the pullout roller pair 61 comes into linear contact with the bending portion 71a, the sheet S generates substantial slide noise.

To address this circumstance, a sheet guide 81 is disposed opposite the sheet guide 71 incorporating the bending portion 71a. The sheet guide 81 includes a cavity 81a and a through-hole 81b that construct a resonance-absorption construction serving as a sound absorber 801. The through-hole 81*b* is disposed in proximity to the bending portion 71*a* and overlaps the bending portion 71*a* in the sheet conveyance direction DS. That is, the through-hole 81*b* is disposed opposite the bending portion 71*a* in the vertical direction perpendicular to the sheet conveyance direction DS. Accordingly, the through-hole 81*b* absorbs the slide noise that generates while the sheet S slides over the bending portion 71*a* directly from the bending portion 71*a*, effectively reducing the slide noise that generates while the pullout roller pair 61 conveys the sheet S. The sheet guide 81 serves as a primary sheet guide. The sheet guide 71 serves as a secondary sheet guide. The bending portion 71*a* serves as a bending portion. The through-hole 81*b* serves as a communication through-hole. The cavity 81*a* serves as a cavity or a hollow.

A sheet feeder such as the ADF 5 installed in the image forming apparatus 1 such as a printer is configured to convey the sheet S while turning the sheet S by 90 degrees to 180 degrees to downsize the image forming apparatus 1 to occupy a reduced space. In this case, it may be difficult to mold a curved sheet guide into a single component. To address this circumstance, two sheet guides are employed so that one sheet guide guides the sheet S to another sheet guide through a transfer portion interposed between the two sheet guides.

For example, as illustrated in FIG. 14, a transfer portion 83 is interposed between the sheet guide 71 and a sheet guide 72 in the sheet conveyance direction DS. The downstream, sheet guide 72 projects outward beyond the upstream, sheet guide 71 and therefore does not catch the leading edge of the sheet S. Accordingly, the surface of the sheet S may come into contact with a downstream end 71*b* of the sheet guide 71 in the sheet conveyance direction DS with an impact, generating substantial slide noise. The downstream end 71*b* bends the sheet S to change the sheet conveyance direction DS while the sheet S slides over the sheet guide 71. In order to suppress the slide noise, a sheet guide 82 is disposed opposite the sheet guide 71 incorporating the downstream end 71*b*. The sheet guide 82 includes a cavity 82*a* and a through-hole 82*b* that construct a resonance-absorption construction serving as a sound absorber 802. The through-hole 82*b* is disposed in proximity to the downstream end 71*b* and overlaps the downstream end 71*b* in the sheet conveyance direction DS. That is, the through-hole 82*b* is disposed opposite the downstream end 71*b* in a horizontal direction perpendicular to the sheet conveyance direction DS.

The sheet guide 82 serves as a primary sheet guide. The sheet guide 71 serves as a secondary sheet guide. The through-hole 82*b* serves as a communication through-hole. The cavity 82*a* serves as a cavity or a hollow.

Accordingly, the through-hole 82*b* absorbs the slide noise that generates while the sheet S slides over the downstream end 71*b* directly from the downstream end 71*b*, effectively reducing the slide noise that generates while the pullout roller pair 61 conveys the sheet S. The transfer portion 83 and the downstream end 71*b* serve as a bending portion.

Figure 15:
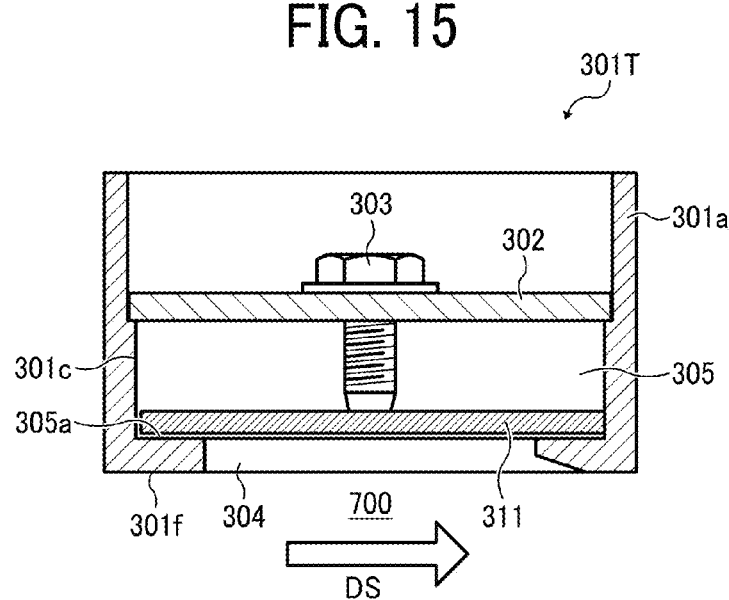
FIG. 15 is a cross-sectional view of a sheet guide as another variation of the sheet guide depicted in FIG. 8.

Referring to FIG. 15, a description is provided of a construction of a sheet guide 301T as another variation of the sheet guide 301 depicted in FIG. 8.

FIG. 15 is a cross-sectional view of the sheet guide 301T having a resonator. As illustrated in FIG. 15, the sheet guide 301T includes a porous member 311 disposed inside the cavity 305 and disposed opposite the sheet conveyance path 700 via the through-hole 304. The porous member 311 is mounted on a sheet conveyance path side face 305*a* of the cavity 305. For example, the porous member 311 is made of polyurethane foam or the like that has an open cell structure where slight bubbles that absorb sound are interconnected. As illustrated in FIG. 5, sound absorption is attained when vibration of air is converted into thermal energy by the viscous resistance on the wall of the through-hole 902*a*.

However, the sheet guide 301 depicted in FIG. 8 attains sound absorption slightly because the viscous resistance generates at a position in proximity to a wall of the through-hole 304. To address this circumstance, the diameter of the through-hole 304 may be decreased substantially to increase a ratio of the area of the wall of the through-hole 304 to the cross-sectional area of the through-hole 304. However, the slight through-hole 304 may not be processed readily and may increase manufacturing costs of parts. Additionally, the slight through-hole 304 may be clogged with a foreign substance such as paper dust, degrading sound absorption.

Figure 16:
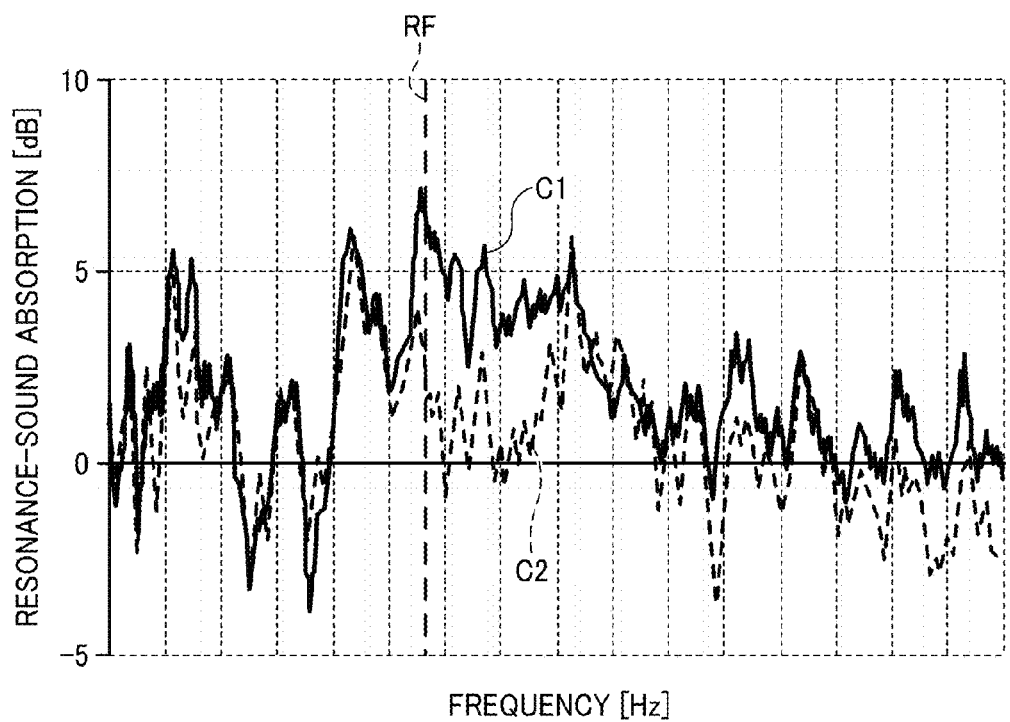
FIG. 16 is a graph illustrating a relation between a frequency of slide noise and a resonance-sound absorption level between the sheet guide depicted in FIG. 8 and the sheet guide depicted in FIG. 15.

Conversely, as illustrated in FIG. 15, the porous member 311 is disposed inside the cavity 305 and disposed opposite the sheet conveyance path 700 via the through-hole 304 and the guide face 301*f* to generate the viscous resistance against a whole moving air, thus enhancing resonance and sound absorption as illustrated in FIG. 16. FIG. 16 is a graph illustrating a relation between the frequency of the slide noise and the resonance-sound absorption level. The graph illustrates a resonance frequency RF, a curve C1 attained with the porous member 311, and a curve C2 attained without the porous member 311.

Figure 17:
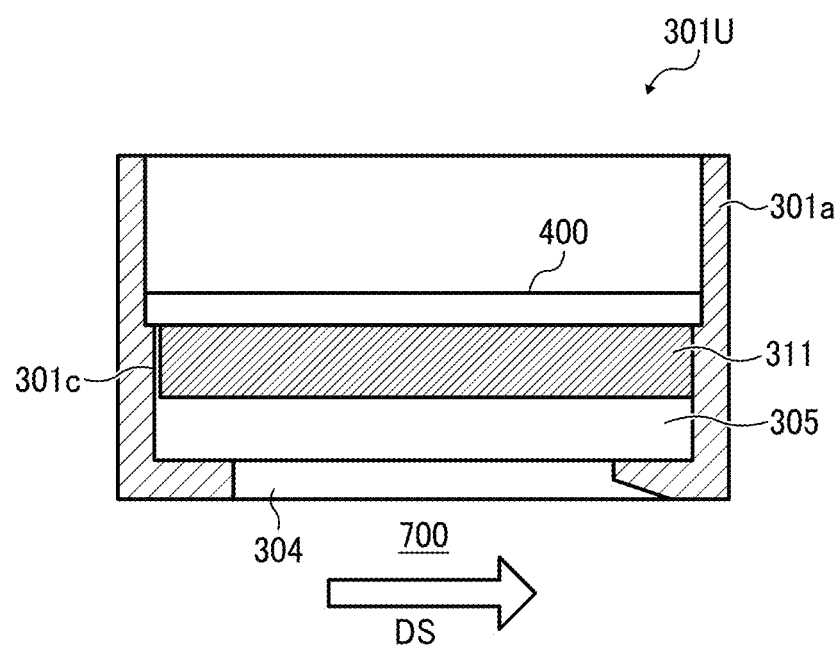
FIG. 17 is a cross-sectional view of a sheet guide as yet another variation of the sheet guide depicted in FIG. 8.

Alternatively, the sheet guide 301T may be made of porous plastic having the open cell structure by molding to increase the viscous resistance at the position in proximity to the wall of the through-hole 304 and thereby enhance sound absorption. Yet alternatively, the porous member 311 may mount a sealing layer 400 that is disposed opposite the sheet conveyance path 700 via the porous member 311 and defines an outer face of the cavity 305 as illustrated in FIG. 17, thus enhancing sound absorption further. FIG. 17 is a cross-sectional view of a sheet guide 301U incorporating the sealing layer 400. The porous member 311 mounts a skin layer, that is, the sealing layer 400, produced during molding. The skin layer remains as the sealing layer 400 to simplify manufacturing of the sealing layer 400 and reduce the number of parts. The sealing layer 400 serves as a sealing member or a sealing portion.

A description is provided of advantages of a sheet conveying device (e.g., the sheet conveying devices 7, 7S, and 7T) and a sheet feeder (e.g., the ADF 5) incorporating the sheet conveying device.

As illustrated in FIGS. 10, 13, and 14, a sheet conveying device includes a conveyer (e.g., the feed belt 59, the pullout roller pair 61, and the CIS exit roller pair 65), a primary sheet guide (e.g., the sheet guides 301, 81, and 82), and a secondary sheet guide (e.g., the sheet guides 308 and 71). The conveyer conveys a sheet (e.g., a sheet S). The primary sheet guide is disposed downstream from the conveyer in a sheet conveyance direction (e.g., the sheet conveyance direction DS) to guide the sheet in the sheet conveyance direction. The secondary sheet guide is disposed opposite the primary sheet guide. The secondary sheet guide includes a bending portion (e.g., the subsidiary guide 309, the bending portion 71*a*, and the downstream end 71*b*) to bend the sheet while the sheet slides over the bending portion to change the sheet conveyance direction. The primary sheet guide and the secondary sheet guide define a sheet conveyance path (e.g., the sheet conveyance path 700). The primary sheet guide includes a sound absorber (e.g., the sound absorbers 800, 801, and 802) that includes at least one cavity (e.g., the cavities 305, 81*a*, and 82*a*) having a hollow shape and at least one communication through-hole (e.g., the through-holes 304, 81b, and 82b). The cavity is disposed opposite one face of the sheet conveyance path. The communication through-hole communicates with the cavity and the sheet conveyance path. The communication through-hole is disposed in proximity to and disposed opposite the bending portion in a direction perpendicular to the sheet conveyance direction.

As described above, as illustrated in FIG. 10, the ADF 5 includes a roller pair (e.g., the CIS exit roller pair 65) that conveys the sheet S (e.g., an original sheet), the sheet guides 301 and 308, and the subsidiary guide 309. The sheet guide 301 guides the sheet S conveyed from the roller pair in a given direction (e.g., the sheet conveyance direction DS). The sheet guide 308 is disposed opposite the sheet guide 301. The subsidiary guide 309 includes the edge 309a over which the sheet S conveyed from the roller pair slides. The edge 309a bends the sheet S and changes the sheet conveyance direction DS. The sheet guides 301 and 308 and the subsidiary guide 309 define the sheet conveyance path 700.

The sheet guide 301 includes the cavity 305 and the through-hole 304 that construct the sound absorber 800. The cavity 305 includes at least one hollow disposed opposite one face of the sheet conveyance path 700. The through-hole 304 communicates with the cavity 305 and the sheet conveyance path 700. The through-hole 304 is disposed in proximity to the edge 309a and is disposed opposite the edge 309a directly in the vertical direction perpendicular to the sheet conveyance direction DS.

The edge 309a serves as a sound source that generates slide noise when the sheet S comes into contact with the edge 309a. The through-hole 304 serves as an inlet to the cavity 305 through which the slide noise generated by the sheet S that comes into contact with the edge 309a enters the cavity 305. The cavity 305 serves as a resonance-absorption construction disposed in the sheet guide 301. The through-hole 304 is disposed in proximity to the edge 309a serving as the sound source and covers the edge 309a in the sheet conveyance direction DS. Accordingly, the through-hole 304 guides the slide noise into the cavity 305 before the slide noise diffuses. Consequently, the ADF 5 attenuates and decreases the slide noise that generates while the sheet S is conveyed sufficiently.

The through-hole 304 may be disposed opposite the edge 309a directly in the vertical direction perpendicular to the sheet conveyance direction DS. Accordingly, the through-hole 304 absorbs the slide noise generated by the edge 309a directly without being blocked by an obstacle or the like. Consequently, the ADF 5 attenuates and decreases the undesired slide noise that generates while the sheet S is conveyed sufficiently.

As illustrated in FIG. 14, the sheet guide 71 includes the downstream end 71b in the sheet conveyance direction DS that serves as a bending portion. The downstream end 71b is disposed opposite the cavity 82a and the through-hole 82b that serve as the sound absorber 802. The downstream end 71b of the sheet guide 71 is spaced apart from the sheet guide 72 serving as a tertiary sheet guide in the sheet conveyance direction DS. The downstream end 71b and the sheet guide 72 define the transfer portion 83 where the sheet S is transferred from the sheet guide 71 to the sheet guide 72. Accordingly, while the two sheet guides 71 and 72 turn the sheet S by 90 degrees to 180 degrees, for example, the cavity 82a and the through-hole 82b attenuate and reduce the slide noise that generates while the sheet S is conveyed through the transfer portion 83.

The downstream end 71b in the sheet conveyance direction DS that serves as a bending portion of the sheet guide 71 is disposed opposite the cavity 82a and the through-hole 82b that serve as the sound absorber 802. Accordingly, the cavity 82a and the through-hole 82b attenuate and reduce the undesired slide noise that generates as the surface of the sheet S comes into contact with the downstream end 71b of the sheet guide 71 in the sheet conveyance direction DS with an impact.

As illustrated in FIG. 15, the sheet guide 301T includes the porous member 311 having the open cell structure. The porous member 311 is disposed inside the cavity 305 and is placed at least at a position disposed opposite the sheet conveyance path 700 via the through-hole 304. The porous member 311 enhances the viscous resistance at a position in proximity to the through-hole 304, facilitating conversion of vibration of air caused by the slide noise into thermal energy and therefore attenuating and reducing the undesired slide noise effectively.

As illustrated in FIG. 17, the sheet guide 301U includes the skin layer produced during molding of the porous member 311. The skin layer remains as the sealing layer 400 disposed opposite the sheet conveyance path 700 via the porous member 311. Instead of the seal 302 depicted in FIG. 15, the sealing layer 400 seals the cavity 305. Accordingly, the sheet guide 301U does not incorporate the seal 302, reducing the number of parts.

Alternatively, at least a part of the sheet guide 301T may be made of porous plastic having the open cell structure. Accordingly, the sheet guide 301T enhances the viscous resistance, facilitating conversion of vibration of air caused by the slide noise into thermal energy and therefore attenuating and reducing the undesired slide noise effectively.

As illustrated in FIG. 9, the through-hole 304S includes the upstream portion 304S1 that is semicircular and the downstream portion 304S2 that is an acute angled triangle and disposed downstream from the upstream portion 304S 1 in the sheet conveyance direction DS. The triangular, downstream portion 304S2 adjoins the semicircular, upstream portion 304S1 to define a drop together with the upstream portion 304S 1. The through-hole 304S does not catch the leading edge of the sheet S while the sheet S is conveyed, thus suppressing jamming or the like of the sheet S.

As illustrated in FIG. 6, the through-hole 304 is a slit elongated in the sheet conveyance direction DS. Compared to the through-hole 304S having the drop shape depicted in FIG. 9, the plurality of through-holes 304 is aligned with the slight interval between the adjacent through-holes 304 to increase the combined cross-sectional area of the through-holes 304. The through-holes 304 guide diffusing sound of the slide noise in an increased amount to the cavity 305, attenuating and reducing the undesired slide noise.

An interval between the through-hole 304 and the edge 309a depicted in FIG. 10 and an interval between the through-hole 82b and the transfer portion 83 or the downstream end 71b depicted in FIG. 14 are not greater than 10 mm. The decreased interval of 10 mm or smaller facilitates the through-holes 304 and 82b to intake diffusing sound of the slide noise in an increased amount, thus reducing the undesired slide noise effectively.

The sheet conveying device (e.g., the sheet conveying devices 7, 7S, and 7T), the image reading device (e.g., the image reading device 6) incorporating the sheet conveying device, and an image forming apparatus (e.g., the image forming apparatus 1) incorporating the sheet conveying device attenuate and reduce the noise that generates while the sheet S is conveyed sufficiently.

The present disclosure is not limited to the details of the example embodiments described above and various modifications and improvements are possible.

The present disclosure has been described above with reference to specific example embodiments. Note that the present disclosure is not limited to the details of the embodiments described above, but various modifications and enhancements are possible without departing from the spirit and scope of the disclosure. It is therefore to be understood that the present disclosure may be practiced otherwise than as specifically described herein. For example, elements and/or features of different illustrative example embodiments may be combined with each other and/or substituted for each other within the scope of the present disclosure.

What is claimed is:

1. A sheet conveying device comprising:
a conveyer to convey a sheet;
a primary sheet guide, disposed downstream from the conveyer in a sheet conveyance direction, to guide the sheet conveyed by the conveyer in the sheet conveyance direction;
a secondary sheet guide being disposed opposite the primary sheet guide and including a bending portion to bend the sheet while the sheet slides over the bending portion to change the sheet conveyance direction; and
a sheet conveyance path defined by the primary sheet guide and the secondary sheet guide,
the primary sheet guide including:
a cavity disposed opposite the sheet conveyance path;
a communication through-hole communicating with the cavity and the sheet conveyance path, the communication through-hole disposed opposite the bending portion in a direction perpendicular to the sheet conveyance direction;
a seal sealing the cavity;
a perimeter wall defining an outer perimeter of the primary sheet guide; and
an interior wall disposed inside the perimeter wall and stepped down from the perimeter wall, the interior wall mounting the seal.

2. The sheet conveying device according to claim 1, wherein the communication through-hole is disposed in proximity to the bending portion.

3. The sheet conveying device according to claim 1, wherein the communication through-hole is disposed opposite the bending portion directly in the direction perpendicular to the sheet conveyance direction.

4. The sheet conveying device according to claim 1, further comprising a tertiary sheet guide spaced apart from the bending portion of the secondary sheet guide in the sheet conveyance direction,
wherein the bending portion of the secondary sheet guide and the tertiary sheet guide define a transfer portion where the sheet is transferred from the secondary sheet guide to the tertiary sheet guide.

5. The sheet conveying device according to claim 1, wherein the bending portion includes a downstream end of the secondary sheet guide in the sheet conveyance direction.

6. The sheet conveying device according to claim 1, wherein the primary sheet guide further includes a porous member disposed inside the cavity and disposed opposite the sheet conveyance path via the communication through-hole, and
wherein the porous member has an open cell structure.

7. The sheet conveying device according to claim 6,
wherein the primary sheet guide further includes a skin layer mounted on the porous member and disposed opposite the sheet conveyance path via the porous member, and
wherein the skin layer is formed by molding of the porous member and seals the cavity.

8. The sheet conveying device according to claim 6,
wherein the porous member is made of polyurethane foam.

9. The sheet conveying device according to claim 1,
wherein at least a part of the primary sheet guide is made of porous plastic having an open cell structure.

10. The sheet conveying device according to claim 1,
wherein the communication through-hole includes:
an upstream portion that is semicircular; and
a downstream portion that is an acute angled triangle and disposed downstream from the upstream portion in the sheet conveyance direction, the downstream portion adjoining the upstream portion to define a drop.

11. The sheet conveying device according to claim 1,
wherein the communication through-hole includes a slit elongated in the sheet conveyance direction.

12. The sheet conveying device according to claim 1,
wherein the communication through-hole is disposed opposite the bending portion with an interval not greater than 10 mm between the communication through-hole and the bending portion.

13. The sheet conveying device according to claim 1,
wherein the primary sheet guide further includes a reinforcing rib being disposed inside the perimeter wall and having a height equivalent to a height of the interior wall.

14. The sheet conveying device according to claim 13,
wherein the primary sheet guide further includes:
a through-hole penetrating through the seal;
a screw bearing mounted on the reinforcing rib; and
a screw inserted into the screw bearing through the through-hole penetrating through the seal to fasten the seal to the perimeter wall.

15. The sheet conveying device according to claim 1,
wherein the bending portion includes an edge disposed at a downstream end of the bending portion in the sheet conveyance direction.

16. The sheet conveying device according to claim 1,
wherein the conveyer includes a belt and a roller pair.

17. A sheet feeder comprising:
a roller pair to feed a sheet; and
a sheet conveying device to convey the sheet fed by the roller pair,
the sheet conveying device including:
a conveyer to convey the sheet;
a primary sheet guide, disposed downstream from the conveyer in a sheet conveyance direction, to guide the sheet conveyed by the conveyer in the sheet conveyance direction;
a secondary sheet guide being disposed opposite the primary sheet guide and including a bending portion to bend the sheet while the sheet slides over the bending portion to change the sheet conveyance direction; and
a sheet conveyance path defined by the primary sheet guide and the secondary sheet guide,
the primary sheet guide including:
a cavity disposed opposite the sheet conveyance path;
a communication through-hole communicating with the cavity and the sheet conveyance path, the communication through-hole disposed opposite the bending portion in a direction perpendicular to the sheet conveyance direction;
a seal sealing the cavity;
a perimeter wall defining an outer perimeter of the primary sheet guide; and
an interior wall disposed inside the perimeter wall and stepped down from the perimeter wall, the interior wall mounting the seal.

18. An image forming apparatus comprising:
an image scanner to read an image on a sheet; and
a sheet conveying device to convey the sheet to the image scanner,
the sheet conveying device including:
   a conveyer to convey the sheet;
   a primary sheet guide, disposed downstream from the conveyer in a sheet conveyance direction, to guide the sheet conveyed by the conveyer in the sheet conveyance direction;
   a secondary sheet guide being disposed opposite the primary sheet guide and including a bending portion to bend the sheet while the sheet slides over the bending portion to change the sheet conveyance direction; and
a sheet conveyance path defined by the primary sheet guide and the secondary sheet guide,
the primary sheet guide including:
   a cavity disposed opposite the sheet conveyance path;
   a communication through-hole communicating with the cavity and the sheet conveyance path, the communication through-hole disposed opposite the bending portion in a direction perpendicular to the sheet conveyance direction;
   a seal sealing the cavity;
   a perimeter wall defining an outer perimeter of the primary sheet guide; and
   an interior wall disposed inside the perimeter wall and stepped down from the perimeter wall, the interior wall mounting the seal.

* * * * *